US008712911B1

(12) United States Patent
Bent et al.

(10) Patent No.: US 8,712,911 B1
(45) Date of Patent: *Apr. 29, 2014

(54) SYSTEM AND METHOD FOR INVESTING PUBLIC DEPOSITS

(71) Applicant: Island Intellectual Property LLC, Manhasset, NY (US)

(72) Inventors: Bruce Bent, Manhasset, NY (US); Bruce Bent, II, Manhasset, NY (US); Arthur T. Bent, III, New York, NY (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/839,890

(22) Filed: Mar. 15, 2013

Related U.S. Application Data

(63) Continuation of application No. 13/715,370, filed on Dec. 14, 2012, which is a continuation of application No. 13/248,647, filed on Sep. 29, 2011, now Pat. No. 8,359,267, which is a continuation of application No. 11/641,046, filed on Dec. 19, 2006, now Pat. No. 8,150,766, which is a continuation-in-part of application No. 10/382,946, filed on Mar. 6, 2003, now Pat. No. 7,536,350.

(60) Provisional application No. 60/442,849, filed on Jan. 27, 2003.

(51) Int. Cl.
*G06Q 40/06* (2012.01)

(52) U.S. Cl.
USPC .............................. 705/39; 705/36 R; 705/35

(58) Field of Classification Search
USPC ............................................... 705/35, 37, 39
See application file for complete search history.

(56) References Cited

U.S. PATENT DOCUMENTS

| 4,232,367 A | 11/1980 | Youden et al. |
| 4,346,442 A | 8/1982 | Musmanno |
| 4,376,978 A | 3/1983 | Musmanno |

(Continued)

FOREIGN PATENT DOCUMENTS

| JP | 10-049590 A | 2/1998 |
| WO | Wo-95/23379 A1 | 8/1995 |

(Continued)

OTHER PUBLICATIONS

U.S. Appl. No. 11/840,052, filed Aug. 16, 2007, Bruce Bent et al.

(Continued)

*Primary Examiner* — Jagdish Patel
(74) *Attorney, Agent, or Firm* — Foley & Lardner LLP

(57) ABSTRACT

A method, system and program product for operating an exchange method for municipal and/or state funds from banking institutions, comprising: accessing, one or more electronic databases holding data on client transaction accounts and funds in aggregated accounts and banking institutions holding Federal government securities; obtaining transaction data; generating instructions to deposit/transfer funds to or withdraw/transfer funds; receiving data for a first deposit from a first one of the banking institutions, where the first deposit comprises municipal funds and/or state funds; selecting, at least another of the banking institutions holding government securities to receive at least a portion of the first deposit of municipal funds and/or state funds; selecting, a plurality of client transaction accounts from one or more of the other banking institutions for the transfer of funds to the first banking institution; generating instructions to deposit/transfer funds.

22 Claims, 5 Drawing Sheets

(56) References Cited

U.S. PATENT DOCUMENTS

| | | |
|---|---|---|
| 4,597,046 A | 6/1986 | Musmanno |
| 4,674,044 A | 6/1987 | Kalmus |
| 4,694,397 A | 9/1987 | Grant |
| 4,700,297 A | 10/1987 | Hagel |
| 4,751,640 A | 6/1988 | Lucas et al. |
| 4,774,663 A | 9/1988 | Musmanno |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano |
| 5,220,501 A | 6/1993 | Lawlor et al. |
| 5,235,507 A | 8/1993 | Sackler |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan |
| 5,424,938 A | 6/1995 | Wagner et al. |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich |
| 5,689,650 A | 11/1997 | McClelland et al. |
| 5,710,889 A | 1/1998 | Clark |
| 5,765,144 A | 6/1998 | Larche |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin |
| 5,826,243 A | 10/1998 | Musmanno |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi |
| 5,878,405 A | 3/1999 | Grant et al. |
| 5,884,285 A | 3/1999 | Atkins |
| 5,890,141 A | 3/1999 | Carney |
| 5,893,078 A | 4/1999 | Paulson |
| 5,903,881 A | 5/1999 | Schrader et al. |
| 5,905,974 A | 5/1999 | Fraser |
| 5,940,809 A | 8/1999 | Musmanno |
| 5,941,996 A | 8/1999 | Smith |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein |
| 6,014,642 A | 1/2000 | El-Kadi et al. |
| 6,016,482 A | 1/2000 | Molinari |
| 6,026,438 A | 2/2000 | Piazza |
| 6,032,133 A | 2/2000 | Hilt et al. |
| 6,041,314 A | 3/2000 | Davis |
| 6,044,371 A | 3/2000 | Person |
| 6,047,324 A | 4/2000 | Ford |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna |
| 6,112,191 A | 8/2000 | Burke |
| 6,119,093 A | 9/2000 | Walker et al. |
| 6,131,810 A | 10/2000 | Weiss |
| 6,154,732 A | 11/2000 | Tarbox |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,522 B2 | 5/2009 | Asano et al. |
| 7,596,522 B1 | 9/2009 | Jacobsen |
| 7,603,307 B2 | 10/2009 | Jacobsen |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,756,767 B2 | 7/2010 | Cluse et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,849,003 B2 | 12/2010 | Egnatios et al. |
| 7,860,771 B2 | 12/2010 | Colvin |
| 7,873,571 B1 | 1/2011 | Wehmer |
| 7,873,573 B1 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 8,103,582 B1 | 1/2012 | Zettner |
| RE43,246 E | 3/2012 | Bent et al. |
| 8,150,766 B1 | 4/2012 | Bent et al. |
| 8,191,156 B2 | 5/2012 | Kubo |
| 8,239,321 B1 | 8/2012 | Bent et al. |
| 8,260,697 B1 | 9/2012 | Bent et al. |
| 8,260,705 B1 | 9/2012 | Bent et al. |
| 8,290,859 B1 | 10/2012 | Bent et al. |
| 8,290,860 B1 | 10/2012 | Bent et al. |
| 8,290,861 B1 | 10/2012 | Bent et al. |
| 8,311,916 B1 | 11/2012 | Bent et al. |
| 8,311,939 B1 | 11/2012 | Bent et al. |

(56) References Cited

U.S. PATENT DOCUMENTS

| | | |
|---|---|---|
| 8,352,342 B1 | 1/2013 | Bent et al. |
| 8,355,985 B1 | 1/2013 | Bent et al. |
| 8,359,267 B1 | 1/2013 | Bent et al. |
| 8,370,236 B1 | 2/2013 | Bent |
| 8,380,621 B1 | 2/2013 | Bent et al. |
| 8,386,382 B1 | 2/2013 | Bent |
| 8,386,383 B1 | 2/2013 | Bent |
| 8,401,962 B1 | 3/2013 | Bent |
| 8,452,702 B1 | 5/2013 | O'Donnell |
| 8,458,089 B1 | 6/2013 | Gareis |
| 8,498,933 B1 | 7/2013 | Bent et al. |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent et al. |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0065642 A1 | 4/2003 | Zee |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0162773 A1 | 8/2004 | Del Rey et al. |
| 2004/0177036 A1 | 9/2004 | Nutahara et al. |
| 2004/0249741 A1 | 12/2004 | Understein |
| 2005/0044035 A1 | 2/2005 | Scott |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1 | 5/2006 | Del Rey et al. |
| 2006/0155644 A1 | 7/2006 | Reid et al. |
| 2006/0167773 A1 | 7/2006 | Yang et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2006/0273152 A1 | 12/2006 | Fields |
| 2006/0282356 A1 | 12/2006 | Andres et al. |
| 2007/0043666 A1 | 2/2007 | Burdette |
| 2007/0083938 A1 | 4/2007 | Aoki et al. |
| 2007/0118449 A1 | 5/2007 | De La Motte |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0138412 A1 | 5/2009 | Jacobsen |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1 | 5/2011 | Jay et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2012/0078750 A1 | 3/2012 | Watkins |
| 2013/0054429 A1 | 2/2013 | Minor et al. |

FOREIGN PATENT DOCUMENTS

| | | |
|---|---|---|
| WO | WO-99/18529 A1 | 4/1999 |
| WO | WO-02/42952 | 5/2002 |
| WO | WO-03/012580 | 2/2003 |
| WO | WO-03/012580 A2 | 2/2003 |
| WO | WO-2005/006111 A2 | 1/2005 |

OTHER PUBLICATIONS

U.S. Appl. No. 12/453,387, filed May 8, 2009, Bruce Bent.
U.S. Appl. No. 12/453,388, filed May 8, 2009, Bruce Bent.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent.
U.S. Appl. No. 13/032,456, filed Feb. 22, 2011, David Edgar Gareis.
U.S. Appl. No. 13/032,467, filed Feb. 22, 2011, Thomas O'Donnell.
U.S. Appl. No. 13/228,031, filed Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,793, filed Aug. 22, 2012, Bruce Bent.
U.S. Appl. No. 13/591,818, filed Aug. 22, 2012, Bruce Bent.
U.S. Appl. No. 13/650,927, filed Oct. 12, 2012, Davud Edgar Gareis.
U.S. Appl. No. 13/651,932, filed Oct. 15, 2012, Bruce Bent.
U.S. Appl. No. 13/710,999, filed Dec. 11, 2012, Bruce Bent, II.
U.S. Appl. No. 13/715,370, filed Dec. 14, 2012, Bruce Bent.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,747, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/842,360, filed Mar. 15, 2013, Bent.
U.S. Appl. No. 13/842,630, filed Mar. 15, 2013, Bent.
Campbell, Andrew, et al.; A new standard for deposit insurance and government guarantees after the crisis; Journal of Financial Regulation and Compliance, vol. 17 No. 3, 2009; pp. 210-239.

(56) References Cited

OTHER PUBLICATIONS

Cynamon et al.; Redefining the Monetary Aggregates: A Clean Sweep; Eastern Economic Journal, vol. 32, No. 4, Fall 2006; pp. 661-672.
American Express—Meeting Notes, Sep. 26, 2000, 2 pages.
American Express Conference Call Minutes, Topic: Tiered Balances, Jan. 25, 2001 @ 3:00pm-4:00pm, 2 pages.
American Express Financial Advisors Customized FDIC Product with Tiered Balances, Jan. 24, 2001, 2 pages.
Email to abufalino@vedderprice.com, from S. Johnson, Re: ReserveFunds and Wayne Hummer, dated Jul. 14, 2003 (attached email to S. Johnson, from abufalino@vedderprice.com on Jun. 26, 2003, Re: ReserveFunds and Wayne Hummer), 2 pages.
Fax to T. Vezeau, from L. Boone, Re: BBII's request to fax to you, dated Dec. 26, 2002 (attached Memo to K.A. Jacklin, from A. Rove, Re: Lert discovery, dated Dec. 23, 2002), 3 pages.
Letter to A.J. Bufalino, from C.R. Macedo, Re: Reserve Management Corporation, Wayne Hummer Investments LLC, Our File: 71297/80, dated Jan. 3, 2006, 2 pages.
Letter to A.J. Bufalino, from C.R. Macedo, Re: Reserve Management Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007, 2 pages.
Letter to A.J. Bufalino, from C.R. Macedo, Re: Reserve Management Corporation, Wayne Hummer Investments LLC, Our File: 71297/80, dated May 8, 2007 (attached Appendices 1-3) 6 pages.
Letter to A.J. Bufalino, from S. Johnson, Re: Response to May 29, 2003 letter/email correspondence, dated Aug. 5, 2003, 1 page.
Letter to A.J. Bufalino, from S. Johnson, Re: Response to May 29, 2003 letter/email correspondence, dated Aug. 5, 2003 (enclosing Jul. 16, 2003 letter to T.M. McDonald, May 29, 2003 fax to B. Bent II, Jan. 10, 2003 letter to R.L. Kratzer, note page),7 pages.
Letter to A.J. Bufalino, from S. Johnson, Re: U.S.P.N. 6,374,231, dated May 29, 2003, 2 pages.
Letter to A.J. Bufalino, from T.J. Vezeau, Re: U.S.P.N. 6,374,231, dated Feb. 11, 2003, 1 page.
Letter to C.R. Macedo, from A.J. Bufalino, Re: Reserve Management Corporation, Wayne Hummer Investments LLC, Our File: 71297/80, dated Mar. 16, 2006, 1 page.
Letter to J. Van De Graff, from R.L. Kratzer, Re: Reserve Management Corp. Assertion, dated Feb. 13, 2003, 1 page.
Letter to R.L. Kratzer, from T.J. VeZeau, Re: U.S.P.N. 6,374,231, dated Jan. 10, 2003, 1 page.
Letter to T.J. Vezeau, from A.J. Bufalino, Re: U.S.P.N. 6,374,231, dated Feb. 7, 2003, 1 page.
Letter to T.M. McDonald, from B. Bent II, Re: FDIC insured money market products, dated Jul. 16, 2003, 1 page.
Letter to T.M. McDonald from B. Bent II, Re; FDIC insured money market products, dated Jul. 16, 2003 (enclosing Jul. 14, 2003 email to abufalino@vedderprice.com, May 29, 2003 letter to A.J. Bufalino, Feb. 13, 2003 letter to J. Van De Graaff, Feb. 11, 2003 letter to A.J. Bufalino, Feb. 7, 2003 letter to T.J. Vezeau, Jan. 10, 2003 letter to R.L. Kratzer), 9 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Pat, Bruce Bent, from Bruce Bent II, Re: Reserve Insured Deposit Account, Sep. 4, 1997, 1 page.
Memo to Marianne, Ralph, Customer Service, from Bruce Bent II, Re: Reserve IDA, Sep. 4, 1997, 1 page.
Case for "CORE" Deposits, Historic Degree of Stability, 2006, 1 page.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.
U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/025,403, filed Feb. 4, 2008, Bent.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
ABA to Approve System for Sharing Deposit Coverage, American Banker, Feb. 11, 2003.
American Banker Online—New Pitch: Deposit Insurance Sharing, Jan. 21, 2003, pp. 1-4.
Bent, "Bruce Bent Makes Money Market Funds Act Like Bank Accounts," Equity BBDP, Oct. 5, 1998, 3 Sheets.
Blackwell, Rob, "New Pitch: Deposit Insurance Sharing", American Banker Online, Jan. 21, 2003.
Britt, "Struggling with Sweep Accounts," America's Community Banker, vol. 6, No. 12, 11 Sheets, Dec. 1, 1997.
Certificate of Deposit Registry Service: Keeping deposits in the corn patch, Banknews, Mar. 2003.
Chapelle, "Merrill's Rivals Say They, Too. Offer Services Beyond Banking," Securities Data Publishing On Wall Street, 2 Sheets, Feb. 1, 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Heavyweight Funding, Bankers News, Mar. 4, 2003, pp. 1-2, vol. II, issue No. 5.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
McReynolds, "The Power of CASH: Ho-hum cash can be great product (and lead to more business) in troubled times," Securities Data Publishing on Wall Street, 3 Sheets, Jun. 1, 2002.
McReynolds et al. "Unusual Products for Unusual Times," Securities Data Publishing on Wall Street, 6 Sheets, May 1, 2001.
News article: "Regulators Support Demand Deposit Bill", Regulatory Compliance Watch—Mar. 9, 1998; p. 1; vol. 9, No. 10.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network: http://www.promnetwork.com/index.html, 2003.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.

(56) References Cited

OTHER PUBLICATIONS

About iMoneyNet, Inc., About iMoneyNet's Money Funds Division, 4 Sheets, Aug. 21, 2003, http://www.ibcdata.com/about.htm.
"Reverse Ups Insurance Limit on Money Market Account," Thomson Financial Inc., Mutual Fund Market News, 1 Sheet, Aug. 26, 2002.
"The Reverse Funds to Offer up to $600,000 of Fdic Insurance on Reserve Insured Deposits; Addressing Investor Needs for Increased Safety, Flexibility and a Competitive Yield," Business Wire, Inc. Business Wire, 2 Sheets, Aug. 13, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"Bank of Oak Ridge to Offer FDIC Insurance on up to $1.5 Million," Dialog Web Comman Mode, 2 Sheets, Sep. 25, 2003, http://www.dialogweb.com/cgi/dwclient.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
Mutual Funds Magazine, Bargain Basement Funds, Oct. 1997, 2 Sheets.
Mutual Funds Magazine, Bargain Basemnt Funds, Oct. 1997, 1 Sheet.
Mutual Funds Magazine, Bargain Basement Funds, Oct. 1997, 1 Sheet.
Money Fund Report, IBC Financial Data, Inc., Nov. 6, 1998, 1 Sheet.
Liberman et al., Market Watch, "How Important are Banks?" FDIC Insurance on Deposits Just One Continuing Advantage, Oct. 17, 2006, 3 Sheets.
The Reserve Funds Press Release "The Reserve Funds and Frontier Bank Partner to Offer Revolutionary Banking Product," 5 Sheets, Aug. 1, 2000.
Capital Briefs: Corporate Checking Account Relief Sought, American Banker, vol. 162, Jul. 28, 1997, 1 Sheet.
Letter From William W. Wiles, Secretary of the Board, Board of Governors of the Federal Reserve System, Jun. 22, 1983, 6 Sheets.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. LEXIS 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp, Ltr. LEXIS 156, Jun. 24, 1994, 3 Sheets.
CMA, Insured Savings Account Fact Sheet, Merrill Lynch, Pierce, Fenner & Smith Incorporated, Jul. 1994, pp. 47-54.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. lnterp. Ltr. LEXIS 419, Oct. 14, 1994, 4 Sheets.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
Letter from Stephanie Martin, Assoc. General Counsel, Board of Governors of the Federal Reserve System, Apr. 22, 2004, 8 Sheets.
Bank Deposit Program, Online http://web.archive.org/web/20030620100115/http:/www.smithbarney.com/products_servi, Jan. 19, 2001, 4 Sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No-Act., Lexis 1593, Securities Exchange Act of 1934—Section 15(a), 11 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Mr. James E. Creekman, Group Vice President, From Oliver Ireland, Associate General Counsel, Aug. 1, 1995, 4 Sheets.
Letter to Ms. Brenda L. Skidmore, Senior Vice President, From Oliver Ireland, Associate General Counsel, Aug. 30, 1995, 4 Sheets.
California Independent Bankers, ICBA Independent Community Bankers of America, Banker Bulletin, 2006, CIB 16th Annual Convention, vol. 4, issue 6, http://www.cib.org/banker_bulletin.htm.
AB 2011 Bill—Chaptered, http://www.leginfo.ca.gov/pub/bill/asm/ab_2001-2050/ab_2011_20060925_chaptered.html.html, 2006, pp. 1-3.
AB2001 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
AB 2011 Assembly Bill—Bill Analysis, Senate Amendmants, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2011_cfa_20060705_161454_sen_floor.html, 2006, pp. 1-7.
12 C.F.R. Part 329—Interest on Deposit, Source: 51 FR 10808, Mar. 31, 1986, 5 Sheets.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

(56) References Cited

OTHER PUBLICATIONS

Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Island Intellectual Property LLC, Lids Capital. LLC, Double Rock Corporation and lntrasweep LLC, against Promontory Interfinancial Network, LLC, Deutsche Bank AA, Deutsche Bank Trust Company Americas and Total Bank Solutions, LLC, Complaint, Apr. 14, 2009, Case No. 09 CV 3750.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and lntrasweep LLC, Amended Complaint, Apr. 15, 2009, Civil Action No. 3:09 CV 217.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies for Financial Institutions, New Sweep Account Helps Retain $40 Million in Business Deposits, vol. 7, No. 12, The Reserve Funds, May 2001, 1 Sheet.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Frost Bank, Member FDIC, CHecking Accounts, 1 Sheet, Sep. 19, 2003, https://www.frostbank.com/cgi-bin/ecomm/frost1/scripts/products/product_detail.jsp?BV_. . . .
In The Know, Important Information About Your Account, Smith Barney Citigroup, 2005, 6 Sheets.
Letter From Joseph A. DiNuzzo, Cousel, Oct. 20, 1999, FDIC, Federal Deposit Insurance Corporation, 1 Sheet.
Letter From Roger A. Hood, Assistant General Counsel, Jul. 16, 1986, FDIC, Federal Deposit Insurance Corporation, Legal Division, 1 Sheet.
Merrill Lynch Announces Beyond Banking, The Power of Advice For Smarter Cash Management, Jan. 8, 2 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002. The Reserve Funds, 1 Sheet.
Money Fund Report, INsured Cash Sweep Options Proliferate, Firday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
O'Brien, "Money-Market Funda Suit Many Inverstors, But Proud Creator Frets About Extra Risk," Re-Printed From The Wall Street Journal, Monday, Nov. 6, 2000, Dow Jones & Company, Inc., 2 Sheets.
On Wall Street, Helping Brokers Build A More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Reserve Funds, NJBA Endorses New Sweep Account Offers New Jersey Banks Deposit Growth, Retention, For Immediate Release, May 23, 2001, 1 Sheet.
The Reserve Funds, Reserve Management and Irwin Union Bank and Trust Company Partner to Offer The Reserve Return Sweep, For Immediate Release, Mar. 8, 2001, 2 Sheets.
Merrill Lynch & You, "Financial Services The Way You Want, When You Want Them," Jan. 2000 4 Sheets.
Ring, National/Global, "Amex Spans The Globe in Retail Bank Buildup," Nov. 27, 2000, 1 Sheet.
The Reserve Funds, Objectives. Observations & Strategies For American Enterprises Inv., Oct. 18, 2000, 11 Sheets.
Dreyfus Insured Deposit Program, Multiple List Program—Effective May 11, 2009, 1 Sheet.
Federal Register: Oct. 9, 1997 (vol. 62, No. 196), pp. 52809-52868. http://www.fdic.gov/news/news/inactivefinancial/1997/fil97111b.html.
Garmhausen, "Matching Small Banks with Large Muni Deposits," American Banker, Online The Financial Services Resource, Oct. 4, 2005, 4 pages, http://www.finstar.com/docs/AmericanBanker.html.
Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.
Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation,, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC'sAnswer to Consolidated First Amended Complaint and Counter Claims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.

(56) References Cited

OTHER PUBLICATIONS

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).
Ring, National /Global, "Amex Spans the Globe in Retail Bank Buildup," Nov. 27, 2000, 1 Sheet.
The Pershing Press, Dreyfus Insured Deposit Program, Issue 2, Aug. 2008, http://www.pershing.com/news/pershing_press/news_466244.html, 2 Sheets.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Product Bulletin from Bill McCain, Subject: Insured Savings Product Announcement, May 8, 1989, 7 pgs.
Insured Savings Project Team Meeting, Feb. 2, 1989, 16 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold exisiting customers' deposits, Mar. 17, 1988, 7 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Letter to Paula Martin, Jul. 3, 1990, 1 pg.
Letter to John Lovell, Jul. 3, 1990, 1 pg.
Email from John Oncken re: Depository Levels at Insured Savings Depositories, Nov. 2, 1989, 1 pg.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investment Company Act of 1940—Section 3(a)(1), 2(a)(36); Securities Act of 1933—Section 2(1), Nov. 29, 1985, Kempter Financial Services, Inc., 9 pgs.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look at Tiers, vol. II, No. 4, Apr. 1987, 6 pgs.
Interest Rate Review © A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Insured Bank Deposit Account, *Information Statement*, Jul. 1, 2000, 2 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: *"Money in the Bank"*, 1997, 2 sheets.

(56) References Cited

OTHER PUBLICATIONS

Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC, and Lids Capital LLC, against Deutsche Bank Trust Company Americas and Total Bank Solutions, Complaint for Patent Infringement, Jury Trial Demanded, Mar. 16, 2010, Case No. 10 CV 2268.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalicity Contentions, Mar. 12, 2010, Civil Action No. 09 Civ. 2675 (VM) (AJP).
Adler, Joe, "Promontory to Roll Out Seposit Service INsuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Litigation Notice After Payment of Issue Fee filed in Parent U.S. Appl. No. 10/382,946, Apr. 3, 2009, 6 pages.
Deutsche Bank Unsured Deposit Program, Marketing Luterature 2007, 3 pages.
Finistar Reg. No. 2,939,558, Registered Apr. 12, 2005.
Hencke, "New Rules for FDIC deposit Insurance", ABA Bank Compliance, vol. 20, No. 7, Jul./Aug. 1999, pp. 31-37.
Jong et al., "The Valuation and Hedging of Variable Rate Savings Accounts," University of Amsterdam, Nov. 15, 2001, 23 Sheets.
Lawsuit by Carlo DeBlasio et al. against Merrill Lynch & Co., Inc. et al., Declaration of Andrew W. Stern, including Exhibits A, B, C, D, E and F, Nov. 11, 2007, Case No. 07-cv-318 (RJS) (Document 59).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Duideline For Business Conduct"; "Commitment to Clarity"; "Cash Management Account"; "Information Statement Regarding Changes to Interest Rates on Deposits in Merrill Lynch Banks".
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).
Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).
Lawsuit by Carlo DeBlasio et al. against Merrill Lynch & Co., Inc. et al., Declaration of Scott D. Musoff in Support of The Merrill Lunch Defendants' Motion to Dismiss the Second Amended Class Action Complaint, ECF Case, Nov. 12, 2007, Case No. 07-cv-318 (RJS) (Document 64).
Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).
Lawsuit by Carlo DeBlasio et al. against Merrill Lynch and Co., Inc. et al., Second Amended Class Action Complaint, Jury Trial Demanded, Introduction and Summary of Allegations, Jun. 11, 2007, Case No. 07-cv-318-VM.
Lawsuit by Carlo DeBlasio et al. against Merrill Lynch & Co., Inc. et al., Supplemental Declaration of Matthew J. Terry in Support of Motion to Dismiss by Defendants Wachovia Corp., Wachovia Securities, LLC, Wachovia Bank N.A., including Exhibits A and B, Mar. 6, 2008, Case No. 07-cv-318 (RJS) (Document 79).
Lawsuit by Carlo DeBlasio, et al. against Merrill Lynch & Co., Inc., et al., Opinion and Order Regarding Motions, Jul. 27, 2009, Case No. 07 CIV 318(RJS).
Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).
Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).
Lawsuit by Island Intellectual Property LLC and Intrasweep LLC against Institutional Deposits Corp. The Island Plantiffs' Complaint against Defendant Institutional Deposits Corp., Nov. 4, 2009, Civil Action No. 1 09-CV-3079.
Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.
Lawsuit by Island Intellectual Property LLC and Intrasweep LLC against Institutional Deposits Corp., Consent Order, Apr. 21, 2010, Case No. 09-CV-3079 (Document 44).
Lawsuit by Island Intellectual Property LLC and Intrasweep LLC, Answer of Defendant Institutuional Deposists Corp. to Complaint for Patent Infringement, Dec. 10, 2009, Case No. 09 CV 03079 (JEC), (Document 16).
Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).
Lawsuit by Island Intellectual Property LLC and Lids Capital LLC against Deutsche Bank Trust COmpany Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM) (Document 114).
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counter Claims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche

(56) References Cited

OTHER PUBLICATIONS

Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, Jun. 25, 2009, Case No. 09 CV 2675.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network , LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Insurance Corporation, 5 Sheets.

Promontory Interfinancial Network, Promontory Interfinancial Network Announces New Deposit Placement Service, Jan. 21, 2003, 3 Sheets.

The Reserve Funds, Objectives, Observations & Strategies for American Enterprises Inv., Oct. 18, 2000, 11 Sheets.

Total Bank Solutions, Bank Sweep FAQs http://www.totalbanksolutions.com/sweepbnkfaqs.htm, Sep. 23, 2005, 2 pages.

Total Bank Solutions, Bank Sweep FAQs, http://www.totalbanksolutions.com/sweepbnkfaqs.htm, Nov. 2, 2005, 3 pages.

Total Bank Solutions, Bank Sweep Products, Deutsche Bank, http://www.totalbanksolutions.com/banksweep.htm, Sep. 23, 2005, 1 page.

Total Bank Solutions, Bank Sweep Products, http://www.totalbanksolutions.com/banksweep.htm, Appendix 3, Oct. 18, 2005, 2 pages.

Total Bank Solutions, Bank Sweep Products, http://www.totalbanksolutions.com/banksweep.htm, Nov. 2, 2005, 2 pages.

Total Bank Solutions, Brokerage Sweep FAQS, http://www.totalbanksolutions.com/brokerfaqs.htm, Nov. 2, 2005, 3 pages.

Total Bank Solutions, Brokerage Sweep, http://www.totalbanksolutions.com/brokersweep.htm, Nov. 2, 2005, 1 page.

Total Bank Solutions, Deposit Bank FAQs, http://www.totalbanksolutions.com/depositbnkfaqs.htm, Nov. 2, 2005, 2 pages.

Total Bank Solutions, Deposits, Deutsche Bank, http://www.totalbanksolutions.com/deposits.htm, Sep. 23, 2005, 1 page.

Total Bank Solutions, Deposits, http://www.totalbanksolutions.com/deposits.htm, Nov. 2, 2005, 2 pages.

Total Bank Solutions, Deutsche Bank Insured Deposit Program, DB Insured Deposit Program Features, http://www.totalbanksolutions.com/features.htm, Sep. 23, 2005, 2 pages.

Total Bank Solutions, Deutsche Bank Insured Deposit Program, http://www.totalbanksolutions.com/, Sep. 23, 2005, 1 page.

Total Bank Solutions, http://www.totalbanksolutions.com/, Mar. 16, 2007, 8 pages.

Total Bank Solutions, http://www.totalbanksolutions.com/overview.htm, Nov. 2, 2005, 1 page.

Total Bank Solutions, Insured Deposit Program Features, http://www.totalbanksolutions.com/features.htm, Nov. 2, 2005, 2 pages.

Total Bank Solutions, Insured Deposit Program, htt://www.totalbanksolutions.com/Insureddeposits.htm, Nov. 2, 2005, 2 pages.

Total Bank Solutions, Partners & Affiliates, http://www.totalbanksolutions.com/partners.htm, Nov. 2, 2005, 3 pages.

Total Bank Solutions, Partners & Affiliates, http://www.totalbanksolutions.com/partners.htm, Oct. 25, 2005, 3 pages.

Total Bank Solutions, Strategic Partners, Nov. 2, 2005, 1 page.

Total Bank Solutions, TBS Deposit Account, About Our Broker Products, http://www.totalbanksolutions.com/brokerproducts.htm, Sep. 7, 2005, 2 pages.

Total Bank Solutions, TBS Management Team. http://www.totalbanksolutions.com/management.htm, Appendix 1, Oct. 18, 2005, 1 page.

Total Bank Solutions, TBS Management Team, http://www.totalbanksolutions.com/management.htm, Nov. 2, 2005, 2 pages.

Total Bank Solutions, TBS Management Team, http://www.totalbanksolutions.com/management.htm, Oct. 25, 2005, 2 pages.

TotalBank Solutions, TBS Bank Deposit Account, Oct. 2004, 6 pgs.

TotalBank Solutions, web.archive.org/web/20050126044216/http://totalbanksolutions.com, Jan. 26, 2005, 2 pgs.

USA Mutual Partners Insured Cash Shelter Account Terms and Conditions, 11 pages, 2009 USA Mutuals Partners, Inc.

Wachovia Securities, Important Information for Clients Concerning Changes in Automatic "Sweep" Arrangements, Oct. 1, 2003, 6 sheets.

Email from Olivia Kim to Charles Macedo on May 13, 2010 with attachment of Lawsuit by Island Intellectual Property LLC, Lids Capital LLC, Double Rock Corporation, and Intrasweep LLC against Deutsche Bank Trust Company Americas and Total Bank Solutions, LLC DefendantTotal Bank Solutions, LLC's responses to Double Rock's Common interrogatory Nos. 1-10 to defendants, Reservation of Right, Civil Action No. 09 Civ. 2675 (VM) (AJP).

Email from Olivia Kim to Charles Macedo on May 13, 2010 with attatchment of Lawsuit by Island Intellectual Property LLC, Lids Capital LLC, Double Rock Corporation, and Intrasweep LLC against Deutsche Bank Trust Company Americas and Total Banks Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).

Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).

Lawsuit by Island Intellectual Property LLC and Intrasweep LLC against Insitutional Seposits Corp., Defendant Institutional Deposits Corp's Preliminary Invalidity Contentions, Mar. 12, 2010, Case No. 09-CV-03079-JEC.

Exhibit 1, Invalidity Chart: IMA and Insurance Plus Service Agreement, U.S. Patent No. 7,509,286, received in Mar. 2010, 21 pgs.

Exhibit 2, Invalidity Chart: Investors Money AccountSM System, U.S. Patent No. 7,509,286, received in Mar. 2010, 26 pgs.

Exhibit 3, Invalidity Chart: Insured Money Account System, U.S. Patent No. 7,509,286, received in Mar. 2010, 26 pgs.

Exhibit 4, Invalidity Chart: U.S. Patent No. 4,985,833 (Oncken), U.S. Patent No. 7,509,286, received in Mar. 2010, 21 pgs.

Exhibit 5, Invalidity Chart: First City Bank of Texas' Insured Savings Program, U.S. Patent No. 7,509,286, received in Mar. 2010, 39 pgs.

Exhibit 6, Invalidity Chart: Quest Insured Account, U.S. Patent No. 7,509,286, received in Mar. 2010, 19 pgs.

Exhibit 7, Invalidity Chart: CIBC World Markets—Insured Bank Deposit Account, U.S. Patent No. 7,509,286, received in Mar. 2010, 16 pgs.

Exhibit 8, Invalidity Chart: Merrill Lynch CMA/ISA Service, U.S. Patent No. 7,509,286, received in Mar. 2010, 72 pgs.

Exhibit 9, Invalidity Chart: 1983 Fed Letter, U.S. Patent No. 7,509,286, received in Mar. 2010, 16 pgs.

Exhibit 10, Invalidity Chart: Merrill Lynch Banking Advantage Program ("MLBA Program"), U.S. Patent No. 7,509,286, received in Mar. 2010, 22 pgs.

Exhibit 11, Invalidity Chart: Merrill Lynch & You + MLBA Information Statement, U.S Patent No. 7,509,286, received in Mar. 2010, 18 pgs.

(56) References Cited

OTHER PUBLICATIONS

Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, received in Mar. 2010, 18 pgs.
Exhibit 14, Invalidity Chart: Alliance Insured Account, U.S. Patent No. 7,509,286, received in Mar. 2010, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, received in Mar. 2010, 351 pgs.
Insured Savings Correspondent Agreement with Exhibits A-D, received in Mar. 2010, 28 pgs.
First City, Texas Insured Savings Agency Agreement with Exhibits A-B and Insured Savings Program, received in Mar. 2010, 10 pgs.
Insured Savings Product Description, Product Name: Insured Savings, Product Description: U.S. Patent #4,985,833, received in Mar. 2010, 3 pgs.
Automatic Insured Deposit Method, Patent Application Inforamtion, Jul. 11, 1988, 17 pgs.
Memorandum for Dick Zinser, re: A First City-Austin deposit program to hold existing customers' deposits, Mar. 17, 1988, 7 pgs.
Insured Savings Remote Site Sweep Procedures, received in Mar. 2010, 3 pgs.
Memorandum from Ken Johnson, re: Attatched Insured Savings Letters, Jul. 5, 1990, 1 pg.
Insured Savings Rate Change Notice, received in Mar. 2010, 1 pg.
A587 Addendum to Insured Savings Agency Agreement, received in Mar. 2010, 1 pg.
Insured Saving Balance Limits form, reveived in Mar. 2010, 1 sheet.
Cash Management Balance Monitoring Agreement Form 1 sheet.
Memorandum from Ed Piner, Subject: Discontinuation of Automatic Balance Monitoring in conjuction with Insured Savings Accounts, May 21, 1991, 1 pg.
Letter from William W. Wiles, Secretary of the Board, Board of Governors of the Federal Reserve System, Jun. 22, 1983, 6 Sheets. (Previously disclosed).
Letter from Oliver I. Ireland, Associate General Counsel, Board of Governors of the Federal Reserve System, Jun. 22, 1988, 5 Sheets. (Previously disclosed).
Allaince Insured Account, Information Statement, Sep. 1999, 6 sheets.
Investors MoneyAccountSM and Insurance Plus Service Agreement, Schedule A, received in Mar. 2010, 3 sheets.
Investors MoneyAccountSM (an FDIC-insured money market account), received in Mar. 2010, 4 sheets.
Investors MoneyAccountSM The FDIC-Insured Money Market with an Important Plus., received in Mar. 2010, 2 sheets.
Investment Company Act of 1940—Section 3(a)(1), 2(a)(1), 2(a)(36); Securities Act of 1933—Section 2(1), Nov. 29, 1985, Kempter Financial Services, Inc., 9 pgs.
Insured Money Account Program Agreement and Disclosure Statement, received in Mar. 2010, 11 sheets.
First National Bank in Brookings, Certificates of Deposit, received in Mar. 2010, 5 sheets.
§204.134, 12 CFR Ch. 11(Jan. 1, 2009 Edition), 2 sheets.
Cran, P. & Krasner, Mike, An iMoney Net Special ReportTM, "Brokerage Cash Sweep Options: The Shift from Money Funds to FDIC-Insured Bank Deposit Account", Nov. 2004, 64 pgs.
The May 1998 Senior Financial Officer Survey, Board of Governors of the Federal Reserve Syetem, with Appendix A, 48 pgs.
Merrill Lynch & You, "Financial Services the Way You Want, When You Want Them," Jan. 2000 4 Sheets. (Previously disclosed).
Merrill Lynch, Pierce, Fenner & Smith Incorporated, "Information Statement," 2000, 12 Sheets. (Previously disclosed).
Quest Insured Account, QUESTessentials, received in Mar. 2010, 3 sheets.

Quest Insured Account, Information Statement, received in Mar. 2010, 5 sheets.
OCC Insured Bank Deposit Account, received in Mar. 2010, 3 sheets.
Letter from Marilyn J. Hensle, announcing Salomon Smith Barney Bank Deposit Program. SM, with Q&A, received in Mar. 2010, 14 sheets.
Bank Depsit program Disclosure Statement, Salomon Smith Barney, received in Mar. 2010, 3 sheets.
The Merrill Lynch Cash Management Account, Financial Service, received in Mar. 2010, 18 pgs.
The Insured Savings Account, Issuer Guide to Offering MMDAs through Merrill Lynch, received in Mar. 2010, 27 pgs.
CMA Insured Saving Account Fact Sheet, 1994, 9 pgs.
A Guide to Your CMA Account, 1995, 9 pgs.
Blackwell, Rob, Salomon'sSweep Plan Raises FDIC Fund Alarm, American Banker, Dec. 6, 2000, 2 pgs.
From 8-K Merill Lynch & Co Inc—MER, Filed: Mar. 7, 2002, Report of unscheduled material events or corporate changes, 41 pgs.
Lawsuit by Island intellectual Property LLC and Intrasweep LLC against Deutsche Bank Trust Company Americaas and Total Bank Solutions, Complaint for Patent Infringement, Jury Trial Demanded, Feb. 23, 2010, Case No. 10 CV 1518, (Document 1).
Lawsuit by Island intellectual Property LLC and Intrasweep LLC against Deutsche Bank Trust Company Americaas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, received in Mar. 2010, 6 pgs.
Federally "Insured Deposit Program", AmVest Capital, received in Mar. 2010, 1 sheet.
Federally Insured Deposit Program for Banks, AmVest capital, Jan. 15, 2010, 2 sheets.
Flow Chart, AmVest Capital, Dec. 9, 2009, 1 sheet.
Flow Business for Federally Insured Deposit Program "FIDP", Deutsche Bank & Trust Company of the Americas, received in Mar. 2010, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth PLatform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, received in Mar. 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio nvesting: Brokerage Features>> Cash Investments>> FDIC. PLUS Program, Jan. 14, 2010, 3 pgs.

(56) References Cited

OTHER PUBLICATIONS

Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, received in Mar. 2010, 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequesntly Asked Question for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, received in Mar. 2010, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, received in Mar. 2010, 2 sheets.
Customer Agreement, Cleared Through Legent Clearing, receieved in Mar. 2010, 3 pgs.
Cash Management, Mesirow Financial—B/D and IA Services, www.mesirowfinancial.com/bdia/cas_mgmt.jsp, Han. 15, 2010, 2 sheets.
Frequently Asked Questions: FDIC Sweep Program, optionsXpress, www.optionsxpress.com/welcom/faq/aq/fdc.aspx#rate. received in Mar. 2010.
Terms & Conditions for optionsXpress' Bank Insured Deposit Program, optionsXpress, received in Mar. 2010, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, www.pershing.com/rates.html, received in Mar. 2010, 1 sheet.
Clearing firms used by the top independent broker-dealers, investment News, www.investmentnews/article/20081214/CHART/812119919, Jan. 15, 2010, 4 sheets.
Objective investment advice Building trust, Wayne Strout, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, received in Mar. 2010, 12 pgs.
Insured deposit account program disclosure booklet, received in Mar. 2010, 16 pgs.
UPDATE New FDIC product at IPI: Deutsche Bank Insured Deposit Program, Investment Professionals INC, Feb. 4, 2009, 11 pgs.
Insured cash account, , http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securitites America, received in Mar. 2010, 3 pgs.
Insured deposit program, www.aigadvisorgroup.com/fdic/03.04.09,htm, Jan. 15, 2010, 3 pgs.
FlexInsured AccountSM , PrimeVest, http://primevest.com/flexInsured_account.asp, Jan. 14, 2010, 1 sheet.
FlexInsuredSM Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, received in Mar. 2010, 2 sheets.
Client account agreement to Sterne Agee Clearing, INC, Sterne, Agee & Leach, Inc and its authorized agents, Feb. 3, 2009, 5 pgs.
Valet a full service asset mangement account, http://valetaccount.com/visaTerms.php, Nov. 12, 2009, 6 pgs.
A sweet suite of business products brings our bank to you, AndroscogginBank, www.androscogginbank.com, received in Mar. 2010, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sounds secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect you cash portfolio!, www.insureddepositsonline.com/component/opinion.com_frontpage/Itemid,1/, Nov. 2, 2009, 1 sheet.
Participating bank analysis, Insured Deposit Program, Evolve Bank & Trust, www.insuredepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.

(56) References Cited

OTHER PUBLICATIONS

The new bank is over 80 years old, Insured Deposit Program, Evolve Bank & Trsut, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance availible, Insured Deposit Program, Deustche Bank, www.insureddepositsonline.com, received in Mar. 2010, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deustche Bank, www.insureddepositsonline.com, received in Mar. 2010, 1 sheet.
Bank insured agency deposit account program custodial account agreement, Evolve Bank & Trust, received in Mar. 2010, 8 pgs.
Insured deposit online, Deutsche Bank Insured Deposit Program, list of program banks, received in Mar. 2010, 2 sheets.
Insured deposit online, The Insured Deposit Program, Evolve Bank & Trust, received in Mar. 2010, 2 sheets.
Insured deposit online, Frequently asked questions, Evolve Bank & Trust, www.insureddepositsonline.com/content/section/3/71, May 14, 2009, 3 pgs..
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, received in Mar. 2010, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, received in Mar. 2010, 1 sheet.
Who can benefit from the insured deposit program?, Insured Deposit Program, Pulaski Bank, received in Mar. 2010, 2 sheets.
Insured agency deposit account terms and conditions, Pulaski Bank, received in Mar. 2010, 1 sheet.
Banks for DBTCA, received in Mar. 2010, 2 sheets.
Total Bank Solutions, Corporate overview, received in Mar. 2010, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, received in Mar. 2010, 7 pgs.
Christopher McCrum, LinkedIn, http://74.125.93.132/search?=cache:5hrs9cebUSjgJ:www.liknedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassbwevsuite.pl? . . . , Nov. 2, 2009, 2 sheets.
Kentucky Bankers Association, Alternative for excess deposit coverage FREE Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, received in Mar. 2010, 1 sheet.
Deutsche Bank, Deutsche Bank insured deposit program, received in Mar. 2010, 3 pgs.
Deutsche Bank Insured Deposits, Bank list as of Dec. 18, 2009, 1 sheet.
DB Advisors, Deutsche Bank Group, Insured Deposit Program, received in Mar. 2010, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pgs.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7, 668, 771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.

(56) References Cited

OTHER PUBLICATIONS

Letter to G.T. Schwartz, from O.I. Ireland, dated Jun. 22, 1988 (response to Dec. 18, 1987 letter re: proposed modifications to Merrill Lynch'sCMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Oct. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Accout Terms), faxed Mar. 28, 2000; 10 pages.
First National Bank in Brookings, Certificates of Deposit [online] [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6FRC Monitor, Dec. 2003, 2 pages.
Board of Governors of the Federal Reserve System, "The May 1998 Denior Financial Officer Survey," May 1998, (attached Appendix A; Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010], Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic 400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," page 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k WIZARD, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments,"Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
A8491 American Express—Meeting Notes Sep. 26, 2000, 2 pages.
American Express Conference Call Minutes, Jan. 25, 2001 @ 3:00pm-4:00pm, Topic: Tiered Balances, 2 pages.

(56) References Cited

OTHER PUBLICATIONS

Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
The Insured Deposit Account: "Money in the Bank," p. 5; Three Little Letters. Three Big Ways to Save in 1998, p. 4.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: INsured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Desciption for the Investor, Draft as of Sep. 20, 1995, 8 pages.
Email from Kim Olivia to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential-Attorney's only, Civil Action No. 09 Civ. 2675 (VM) (AJP).
Email from Kim Olivia to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10, to defendants Resercation of Right, Civil Action No. 09 Civ. 2675 (VM) (AJP).
Email from Kim Olivia to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
Insured Bank Deposit Program Summary Information Statement, Information Statement, and list of Eligible Program Banks Effective Feb. 10, 2005, 11 pages.
Promontory Interfinancial Betwork: Frequently Asked Questions (FAQs), Feb. 5, 2003, 5 pages.
Dreyfus Insured Seposit Program Disclosure Statement and Terms and Conditions, received Mar. 2008, 12 pages.
Lawsuit by Island Intellectual Property LLC et al., against Deutsche Bank Trust Comapny Americas, et al.; Expert Report of Richard T. Powers Concerning Invalidity of U.S. Pat. Nos. 7,509,286; 7,519,551; 7,536,350;7,668,771;7,668,772;7,672,886; and 7,680,734; and Exhibits A-R; Civil Action No. 09 Civ. 2675(VM)(AJP), Oct. 28, 2010; 1.119 pages.
Lawsuit by Island Intellectual Propert LLC, et al. against Deutsche Bank Trust Company Americas, et al.; Expert Report of Ivan Zatkovich Regarding Validity and Enfroceability of the Asserted Claimsd of the Patents-in-Suit; Civil Action No.: 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Ecpert Report of the Honorable Gerald J. Mossinghoff and Exhibits A-E; Civil Action No. 09 Civ. 2675 (VM) (AJP); Nov. 23, 2010; 107 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by *Island Intellectual Property LLC* v. *Clearview Correspondent Services, LLC, et al.*; Branch Banking & Trust Company'sAnswer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*, Declaration of Charles R. Macedo 2 in support of Plaintiffs' motions in limine Nos. 4-6; Case 1:09-cv-02675-KBF; Doc. 260; Feb. 3, 2012; pp. 1-3.
*Island Intellectual Property LLC et al.* v. *Deutsche Bank Trust Company Americas, et al.*, Defendants' opposition to Plaintiffs' motion in limine #3 to preclude defendants' expert Richard T. Powers for testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.*, Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche Bank Trust Company Americas, et al.*, Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.*, Plaintiffs' brief in support of the motion in limine #3 to preclude defendants' expert Richard T. Powers from testifying that the Merrill Lynch CMA/ISA product includes omnibus accounts based on 17-year old double hearsay that is uncorrobo-

(56) References Cited

OTHER PUBLICATIONS rated and in cotravention of documentary and oral evidence of record; Case 1:09-cv-02675-KBF; Doc. 247; Jan. 30, 2012; pp. 1-20.

*Island Intellectual Property LLC et al. v. Deutsche Bank Trust Company Americas, et al.*, Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC et al. v. Deutsche Bank Trust Company Americas, et al.*, Plaintiffs' motion in limine #4 to preclude evidence and argument regarding Plaintiffs' Confidential Oct. 18, 2000 presentation to American Enterprises Investment Services at trial; Case 1:09-cv-02675-KBF; Doc. 257; Feb. 3, 2012; pp. 1-10.

*Island Intellectual Property LLC et al. v. Deutsche Bank Trust Company Americas, et al.*, Plaintiffs' Notice of Motion and Motion in Limine #3 to preclude Defendants' expert Richard T. Powers from testifying that the Merrill Lynch CMA/ISA productincludes omnibus accounts based on 17-year old double hearsay that is uncorroborated and in contravention of documentary and oral evidence of recors; Case 1:09-cv-02675-KBF, Doc. 2346; Jan. 30, 2012; pp. 1-2.

*Island Intellectual Property LLC et al. v. Deutsche Bank Trust Company Americas, et al.*, Plaintiffs' notice of motion and motion in limine #3 to preclude testimony of Gilbert Schwartz; Case 1:09-cv-02675-KBF; Doc. 259; Feb. 3, 2012; pp. 1-2.

*Island Intellectual Property LLC et al. v. Deutsche Bank Trust Company Americas, et al.*, Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Knight-Ridder; Money Matters, Tips you can use—Limits Apply as FDIC Insurance Covers Depositor, Not Account; Chicage Tribune; Feb. 4, 1998; 2 pages.

Lawsuit by *Island Intellectual Property LLC et al. v. Deutsche Bank Trust Company Americas, et al.*, Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC et al. v. Clearview Correspondent Services, LLC, et al.*, Branch Baking & Trust Company's Answer to Complaint and Counterclaims; Civil Action No. 1:11-cv-448-LO-IDD; Jun. 20, 2011; 13 pages.

Lawsuit by *Island Intellectual Property LLC et al. v. Deutsche Bank Trust Company Americas, et al.*, Declaration of Olivia M. Kim in Support of Defendants' Motion for Summary Judgement on Invalidity Under 35 U.S.C. § 101; Oct. 6, 2011; Case 1:09-cv-02675-VM, Document 197.

Lawsuit by *Island Intellectual Property LLC et al. v. Deutsche Bank Trust Company Americas, et al.*, Plaintiffs' Memorandum of Law in Opposition to Defendants' Motion for Summary Judgement of Invalidity Under 35 U.S.C. § 101; Nov. 2, 2011; Case 1:09-cv-02675-VM, Document 201.

Lawsuit by *Island Intellectual Property LLC et al. v. Deutsche Bank Trust Company Americas, et al.*, Defendants Reply in SUpport of Their Motion for Summary Judgement of Invalidity Under 35 U.S.C. § 101; Nov. 15, 2011; Case 1:09-cv-02675-VM, Document 208.

Lawsuit by *Island Intellectual Property LLC et al. v. Deutsche Bank Trust Company Americas, et al.*, Defendants' Response to Plaintiffs' Statement of Additional Material Facts in Support of Plaintiffs' Opposition to Defendants' Motion for Summary Judgement of Invalidity Under 35 U.S.C. § 101; Nov. 15, 2011; Case 1:09-cv-02675-VM, Document 209.

Lawsuit by *Island Intellectual Property LLC et al. v. Deutsche Bank Trust Company Americas, et al.*, Order; Dec. 7, 2011; Case 1:09-cv-02675-VM, Document 212.

Lawsuit by *Island Intellectual Property LLC et al. v. Deutsche Bank Trust Company Americas, et al.*, Special Master's Report and Recommended Decision on Defendants' Summary Judgement Motion of Invalidity Under 35 U.S.C. § 101; Dec. 19, 2011.

Lawsuit by *Island Intellectual Property LLC et al. v. Deutsche Bank Trust Company Americas, et al.*, Supplemental Declaration of Olivia M. Kim in Support of Defendants' Opening and Reply Claim Construction Briefs; Nov. 15, 2011; Case 1:09-cv-02675-VM, Document 207.

Martens, Don W.; Letter to Hon. Victor Marrero re. supplement to letter of Nov. 28, 2011 on tentative rulings on claim construction in *Island Intellectual Property LLC et al. v. Deutsche Bank Trust Co., et al.*, Nov. 28, 2011; Case 1:09-cv-02675-VM; Document 211.

Martens, Don W.; Letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.

Scottrande Bank Deposit Program—Terms, Conditions & Disclosures; Author unknown; 8-11; pp. 1-3.

Hencke, Christopher; New Rules for FDIC Deposit Insurance; ABA Bank Compliance, Jul./Aug. 1999, 20,7; pp. 31-37.

The Merrill Lynch Cash Management Account—Financial Service; Jan. 1985; 18 pages.

12 CFR Part 330; Simplification of Deposit Insurance Rules; Federal Register, vol. 63 Issue 90; May 11, 1998; pp. 1-31.

Declaration of Mr. Bruce Bent II, Vice Chairman and Registrant of Applicant. (3 Sheets) and Exhibits A, B, C and D, Mar. 1, 2007 (6 Sheets).

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994, 2 Sheets.

Insured Cash Account Program Disclosure Booklet, LPL Financial Services, Linsco/Private Ledger, Member NASD/SIPC, Jun. 26, 2006, 26 sheets.

Merriam-Webster Online Dictionary, 10th Edition, Definition of "Associated", Jan. 30, 2009, 2 Sheets.

Merrill Lynch, Pierce, Fenner & Smith Incorporated, "Information Statement," 2000, 12 Sheets.

Finistar, Providing FDIC Insured Funds as a Stable Source of Deposits to Commercial Banking Institutions, Jan. 12, 2004, 16 Sheets, www.Finistar.com.

The Unmatched Sweep Solution From The Cash Management Expert, 1999, 2 Sheets.

Waddell, "Sweeping Clean," Advisor, The Advisor to Advisors, Oct. 2001, 2 Sheets.

Dreyfus Insured Deposit Program, Disclosure Statement and Terms and Conditions, Dreyfus A BNY Mellon Company, received Jan. 2008 (approx.), 8 Sheets.

Lake Forest Bank & Trust Company, Introducing Max Safe Deposite Accounts with up to $3.75 Million in FDIC Insurance, www.lakeforestbank.com/maxsafe, Nov. 21, 2008, 2 Sheets.

Insured Savings Correspondent Agreement with Exhibits A-D, 2002 or earlier, 28 pgs.

First City, Texas Insured Savings Agency Agreement with Exhibits A-B and Insured Savings Program, 1996 or earlier, 10 pgs.

Insured Savings Remote Site Sweep Procedures, 1996 or earlier, 3 pgs.

Insured Savings Rate Change Notice, Jul. 17, 1990, 1 pg.

Addendum to Insured Savings Agency Agreement, Jul. 17, 1990, 1 pg.

Insured Savings Balance Limits form, 1996 or earlier, 1 sheet.

Cash Managment Balance Monitoring Agreement Form, 1996 or earlier, 1 sheet.

Investors MoneyAccount$^{SM}$ and Insurance Plus Service Agreement, Schedule A, Mar. 1994, 3 sheets.

Investors MoneyAccount$^{SM}$ (an FDIC-insured money market account), Apr. 1996, 4 sheets.

Insured Money Account Program Agreement and Disclosure Statement, Mar. 2000, 11 sheets.

Quest Insured Account, *QUESTessentials*, May 17, 1994, 3 sheets.

Quest Insured Account, *Information Statement*, 2002 or earlier, 5 sheets.

OCC Insured Bank Deposit Account, Jun. 1993, 3 sheets.

Letter from Marilyn J. Hensle, announcing Salomon Smith Barney Bank Deposit Program.$^{SM}$, with Q&A, Aug. 16, 2000, 14 sheets.

(56) References Cited

OTHER PUBLICATIONS

The Merrill Lynch Cash Managemnt Account, Financial Service, 1982, 18 pgs.

The Insured Savings Account, Issuer Guide to Offering MMDAs through Merrill Lynch, Jul. 1986, 27 pgs.

Lawsuit by Island Intellectual Property LLC and Intrasweep LLC against Institutional Deposits Corp., Defendant Institutional Deposits Corp.'s Preliminary Invalidity Contentions, Mar. 15, 2010, Case No. 09-CV-03079-JEC.

Exhibit 1, Invalidity Chart: IMA and Insurance Plus Service Agreement, U.S. Patent No. 7,509,286, Mar. 2010, 21 pgs.

Exhibit 2, Invalidity Chart: Investors Money Account$^{SM}$ System, U.S. Patent No. 7,509,286, Mar. 2010, 26 pgs.

Exhibit 3, Invalidity Chart: Insured Money Account System, U.S. Patent No. 7,509,286, Mar. 2010, 26 pgs.

Exhibit 4, Invalidity Chart: U.S. Patent No. 4,985,833 (Oncken), U.S. Patent 7,509,286, Mar. 2010, 21 pgs.

Exhibit 5, Invalidity Chart: First City Bank of Texas' Insured Savings Program, U.S. Patent No. 7,509,286, Mar. 2010, 39 pgs.

Exhibit 6, Invalidity Chart: Quest Insured Account, U.S. Patent No. 7,509,286, Mar. 2010, 19 pgs.

Exhibit 7, Invalidity Chart: CIBC World Markets—Insured Bank Deposit Account, U.S. Patent No. 7,509,286, Mar. 2010, 16 pgs.

Exhibit 8, Invalidity Chart: Merrill Lynch CMA/ISA Service, U.S. Patent No. 7,509,286, Mar. 2010, 72 pgs.

Exhibit 9, Invalidity Chart: 1983 Fed Letter, U.S. Patent No. 7,509,286, Mar. 2010, 16 pgs.

Exhibit 10, Invalidity Chart Merrill Lynch Banking Advantage Program ("MLBA Program"), U.S. Patent No. 7,509,286, Mar. 2010, 22 pgs.

Exhibit 11, Invalidity Chart: Merrill Lynch & You + MLBA Information Statement, U.S. Patent No. 7,509,286, Mar. 2010, 18 pgs.

Exhibit 12, Invalidity Chart: Smith Barney Insured Deposit Account, U.S. Patent No. 7,509,286, Mar. 2010, 22 pgs.

Exhibit 13, Invalidity Chart: Smith Barney Bank Deposit Program, U.S. Patent No. 7,509,286, Mar. 2010, 18 pgs.

Exhibit 14, Invalidity Chart: Alliance Insured Account, U.S. Patent No. 7,509,286, Mar. 2010, 16 pgs.

Exhibit 15, Invalidity Chart: Reserve's American Express Presentation, U.S. Patent No. 7,509,286, Mar. 2010, 16 pgs.

Exhibit 16, Invalidity Chart: U.S. Patent No. 7,376,606 (Jacobsen), U.S. Patent No. 7,536,350, Mar. 2010, 6 pgs.

Exhibit 17, Obviousness Combinations Chart, U.S. Patent No. 7,509,286, Mar. 2010, 351 pgs.

SYSTEM AND METHOD FOR INVESTING PUBLIC DEPOSITS

CROSS-REFERENCE TO RELATED PATENT APPLICATIONS

This application is a Continuation of U.S. application Ser. No. 13/715,370 filed Dec. 14, 2012 which is a Continuation of Ser. No. 13/248,647, filed Sep. 29, 2011, which is a Continuation of U.S. application Ser. No. 11/641,046, filed Dec. 19, 2006, now U.S. Pat. No. 8,150,766 issued Apr. 3, 2012, which is a Continuation-In-Part of U.S. application Ser. No. 10/382, 946, filed Mar. 6, 2003, now U.S. Pat. No. 7,536,350 issued May 19, 2009, which claims priority from Provisional U.S. Application 60/442,849, filed Jan. 27, 2003. All of the aforesaid applications are incorporated herein by reference in their entirety as if fully set forth herein.

RELATED APPLICATION

The present application is a continuation-in-part of U.S. patent application Ser. No. 10/382,946, filed on Mar. 6, 2003, which is hereby incorporated by reference as if fully set forth herein.

FIELD OF THE INVENTION

The present invention generally relates to a system and method for investing public deposits from federal, state or municipal entities.

BACKGROUND OF THE INVENTION

Banks and local banks in particular, operate by accepting deposits on which they pay out one rate of interest, and use those deposits to make investment or loans which earn a higher rate of return. Thus, for example, FIG. 1 illustrates a bank 10, which receives deposits from a plurality of customers C1 through Cn. Typically, these customers would be paid a going rate of interest, e.g., 5%. The funds deposited by these customers are in turn used by the bank 10 to make loans to borrowers B1 through Bo, at a higher rate, e.g., 7%. Thus, the bank will realize a profit on the spread between the loaning rate, e.g., 7% in this example, and the deposit rate, e.g., 5% in this example.

Banks often are obliged by statute, practice or sense of community to accept public deposits from federal, state or municipal entities. To comply with applicable bank regulatory requirements, public deposits of federal, state or municipal entities (e.g., municipality 12) often must be federally insured or, alternatively, "collateralized" by having banks pledge government securities 14 (e.g., U.S. Treasury or U.S. Agency obligations) to secure public deposits in the event of the institution's failure. Public deposits may be for any amounts. The interest rates that such a bank 10 typically pays for such public deposits are generally higher than the rates of interest it pays its other customers, e.g., C1 through Cn. However, the interest earned on government securities 14 typically do not provide an interest spread as do commercial and consumer loans to borrowers B1 though Bo over the banks cost of deposits.

Thus, what is needed is a method and system by which banks can earn greater returns on their investment of public deposits.

SUMMARY OF THE INVENTION

It has now been found that the higher spreads and related objects of the present invention can be obtained through a method for investing public deposits according to an exemplary embodiment of the present invention comprising: receiving one or more first deposits from each of one or more customers, where the one or more customers are public entities and the one or more first deposits are required to be federally insured or collateralized by government securities; transferring at least a portion of the one or more first deposits to a money center banking institution; sending first electronic signals relating to information on the at least a portion of the one or more first deposits to the money center banking institution; receiving one or more second deposits from the money center banking institution, where the one or more second deposits are covered at least in part by federal deposit insurance; receiving second electronic signals relating to information on the one or more second deposits from the money center banking institution; depositing the one or more second deposits in accounts that have at least a first rate of return; and investing the one or more second deposits in investments that have at least a second rate of return, where the second rate of return is equal to or greater than the first rate of return.

A method for investing public deposits according to another exemplary embodiment of the present invention comprises the steps of receiving one or more first deposits from a banking institution, where the one or more first deposits are from public entities and are required to be federally insured or collateralized by government securities; receiving first electronic signals relating to the one or more first deposits from the banking institution; investing the one or more first deposits in securities that are federally insured or collateralized by government securities; transferring one or more second deposits to the banking institution, where the one or more second deposits are covered at least in part by federal deposit insurance; and sending second electronic signals relating to the one or more second deposits to the banking institution.

A method for investing public deposits according to another exemplary embodiment of the present invention comprises receiving one or more first deposits from each of one or more customers, where the one or more customers are public entities and the one or more first deposits are required to be federally insured or collateralized by government securities; transferring one or more portions of the one or more first deposits to a corresponding one of one or more banking institutions, each of the one or more portions to be covered by federal deposit insurance; sending first electronic signals to each of the one or more banking institutions relating to information on the one or more portions of the one or more first deposits to the one or more banking institution; receiving a second deposit from at least one of the banking institutions, the second deposit received from the at least one banking institution being equal or lesser or greater in amount compared to the portion transferred thereto; receiving second electronic signals relating to information on the second deposit from the at least one banking institution; depositing the second deposit in one or more accounts that have at least a first rate of return; and investing or having invested the at least one second deposit in an investment that has at least a second rate of return, where the second rate of return is equal to or greater than the first rate of return.

A method for investing public deposits according to another exemplary embodiment of the present invention comprises receiving a first deposit from a banking institution, where the first deposit is a portion of funds deposited into the banking institution from a public entity required to be federally insured or collateralized by government securities; receiving first electronic signals relating to the first deposit from the banking institution; depositing the first deposit in an account that has a first rate of return and is federally insured;

investing at least a portion of the first deposit in one or more investments that have a second rate of return, where the second rate of return is equal to or greater than the first rate of return; transferring a second deposit to another banking institution, the second deposit being equal or lesser or greater in amount compared to the first deposit; and sending second electronic signals relating to the second deposit to the banking institution.

A system for exchanging funds to allow for effective investment of public deposits, comprises a first deposit receipt unit for receiving one or more first deposits from each of one or more customers, where the one or more customers are public entities and the one or more first deposits are required to be federally insured or collateralized by government securities; a deposit transfer unit for transferring at least a portion of the one or more first deposits to a money center banking institution; a signal generator for generating and sending first electronic signals relating to information on the at least a portion of the one or more first deposits to the money center banking institution; a second deposit receipt unit for receiving one or more second deposits from the money center banking institution, where the one or more second deposits are covered at least in part by federal deposit insurance; and a signal receiver for receiving second electronic signals relating to information on the one or more second deposits from the money center banking institution.

A system for exchanging funds to allow for effective investment of public deposits according to another exemplary embodiment comprises a first deposit receipt unit for receiving one or more first deposits from each of one or more customers, where the one or more customers are public entities and the one or more first deposits are required to be federally insured or collateralized by government securities; a deposit transfer unit for transferring one or more portions of the one or more first deposits to a corresponding one of one or more banking institutions; a signal generator for generating and sending first electronic signals to each of the one or more banking institutions relating to information on the one or more first deposits to the one or more banking institution; a second deposit receipt unit for receiving a second deposit from at least one of the banking institutions, the second deposit received from the at least one banking institution being equal or lesser or greater in amount compared to the portion transferred thereto; and a signal receiver for receiving second electronic signals relating to information on the second deposits from the one or more banking institutions.

In a yet further embodiment of the invention, a program product is provided for exchanging funds to allow for effective investment of public deposits, comprising: at least one computer usable media having computer readable program code embodied therein or among them if there is more than one computer usable medium, to be executed by a computer, the computer readable program code comprising program code for facilitating receipt of one or more first deposits from each of one or more customers, where the one or more customers are public entities and the one or more first deposits are required to be federally insured or collateralized by government securities; program code for transferring at least a portion of the one or more first deposits to a money center banking institution; program code for causing generation and sending first electronic signals relating to information on the at least a portion of the one or more first deposits to the money center banking institution; program code for facilitating receipt of one or more second deposits from the money center banking institution, where the one or more second deposits are covered at least in part by federal deposit insurance; and program code for receiving second electronic signals relating to information on the one or more second deposits from the money center banking institution.

In a yet further embodiment, a program product is provided for exchanging funds to allow for effective investment of public deposits, comprising: at least one computer usable media having computer readable program code embodied therein or among them if there is more than one computer usable medium, to be executed by a computer, the computer readable program code comprising program code for facilitating receipt of one or more first deposits from each of one or more customers, where the one or more customers are public entities and the one or more first deposits are required to be federally insured or collateralized by government securities; program code for transferring one or more portions of the one or more first deposits to a corresponding one of one or more banking institutions; program code for causing generation and sending first electronic signals to each of the one or more banking institutions relating to information on the one or more portions of the one or more first deposits to the one or more banking institution; program code for facilitating receipt of a second deposit from at least one of the one or more banking institutions, the second deposit received from the at least one banking institution being equal or lesser or greater in amount compared to the one or more portion received thereby; and program code for receiving data from second electronic signals relating to information on the at least one second deposit from the one or more banking institutions.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

The present invention generally relates to a system and method of investing deposits from federal, state or municipal entities.

Figure 1:
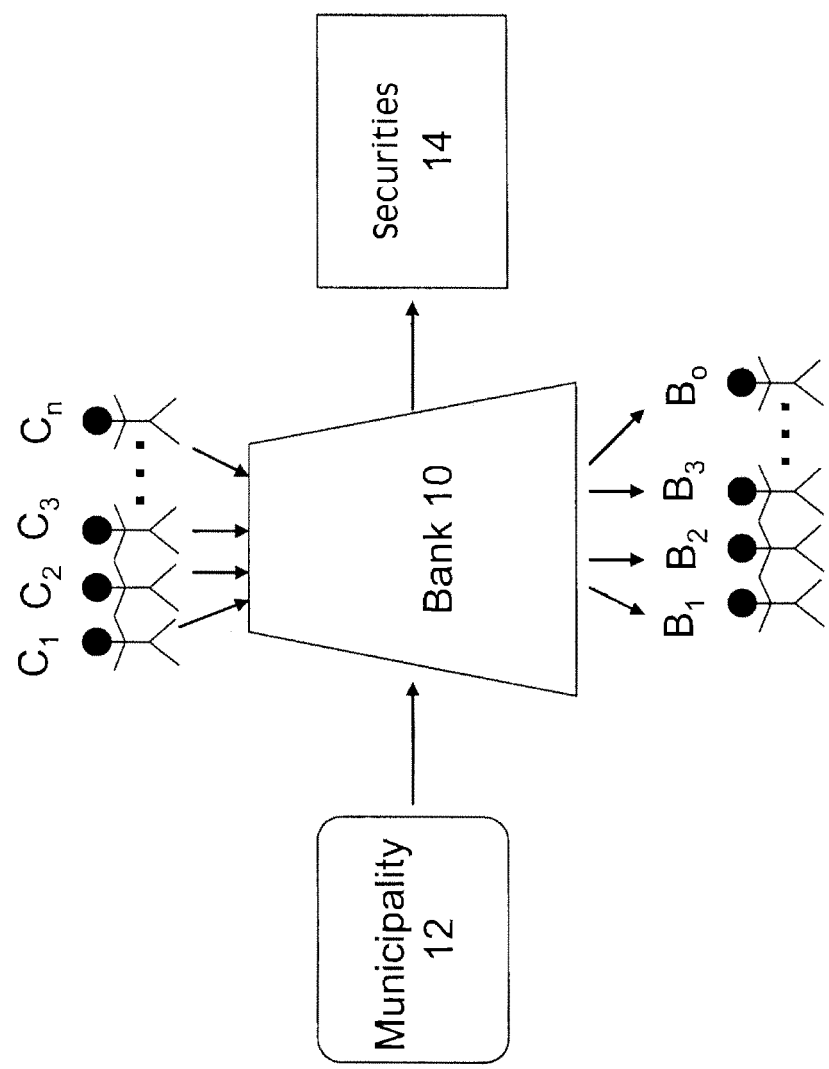
FIG. 1 is a block diagram of a prior art system for a bank.
Figure 2:
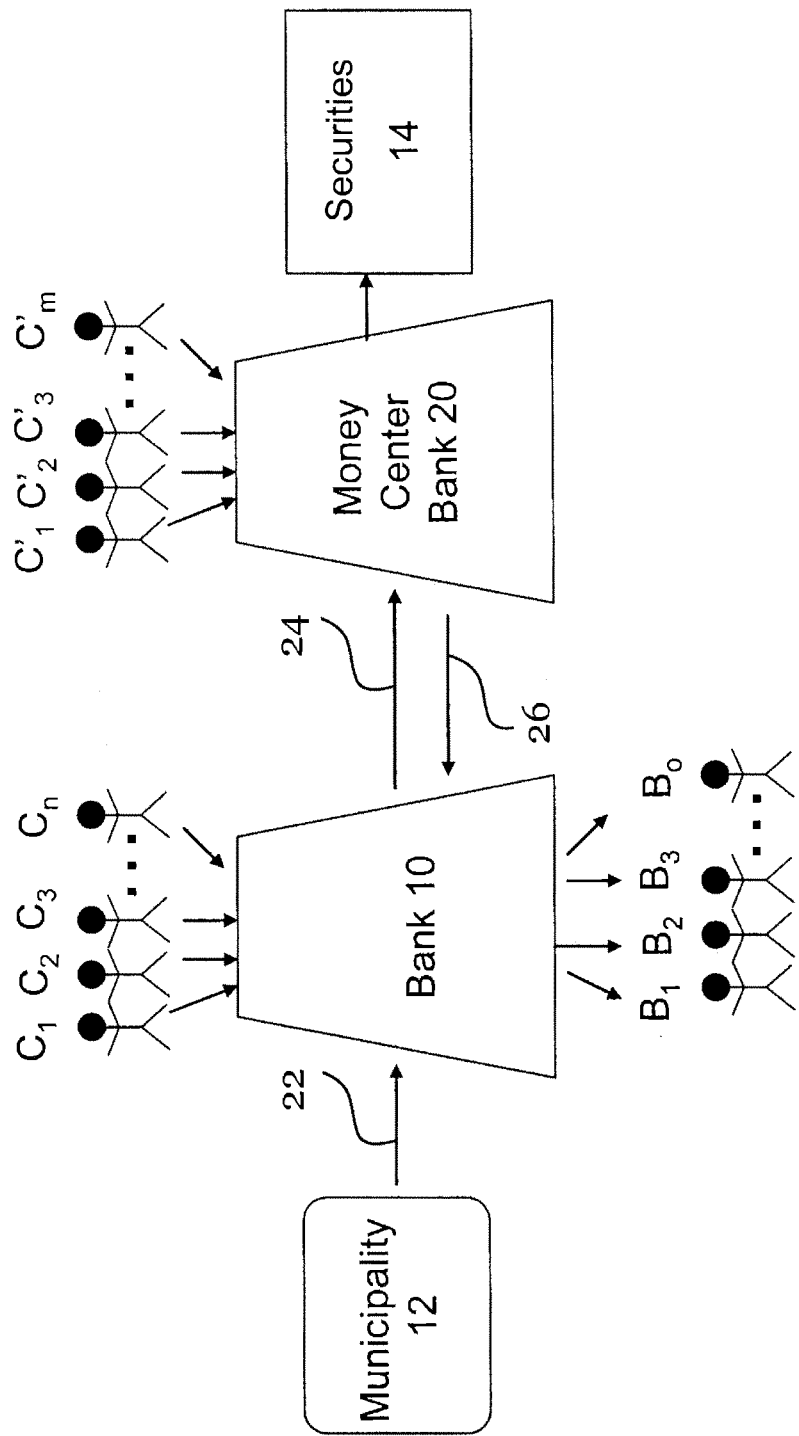
FIG. 2 is a block diagram of an embodiment of the present invention.

FIG. 2 illustrates an embodiment of the present invention. As with the prior art system illustrated in FIG. 1, bank 10, accepts deposits from customers C1 through Cn which can in turn be loaned out to borrowers B1 though Bo for a spread. Bank 10 also accepts public deposits on line 22 from, e.g., a municipality 12. In accordance with an embodiment of the present invention, all or a portion of the public deposits are, in turn, deposited electronically, by messenger, or by any other convenient method, in a money center bank 20, which has an ample investment position in government securities 14. This deposit is represented by line 24. In one embodiment, a first electronic signal is sent relating to information on the deposits transferred to the money center banking institution. This first electronic signal is also represented by line 24. A money center bank 20 is typically a larger banking institution with a larger deposit base. Typically in practice, money center banks have large inventories of government securities 14, such that if they take in additional public deposits, the purchase of additional government securities 14 will not be necessary to collateralize such deposits.

In exchange for public deposits from the bank 10 (e.g., $1 million), the money center bank 20 in turn deposits electronically, or by messenger, or by any other convenient method, an amount of total funds in return in the bank 10 that comes from customer C'1 though C'm. This deposit is represented by line 26. By way of example, this return deposit could be equal to, larger than, or a smaller amount (e.g., $750,000). This smaller amount of the funds deposited from the money banking center may be related to the amount transferred from the bank 10 by a numerical function negotiated by the banks, e.g., it could be a percentage. A second electronic signal is sent relating to information on the deposits transferred to the bank 10. This second electronic signal is also represented by line 26. In one embodiment, the deposit accounts of customers C'1-C'm are selected because they each have less in their respective accounts than the maximum amount of deposits covered by federal deposit insurance in their accounts, which is currently $100,000 per individual account. By way of example, a criterion for selecting customer accounts could be that the accounts chosen for the transfer are $98,000 or less, and in a variation of this embodiment may be required to be above some minimum amount, to allow for interest earned to be deposited to the account. Note however, that the invention is not restricted to sending back only insured deposits. For example, where the accounts at the sending and receiving banks are omnibus accounts, the second deposit back to the bank 40 could contain funds from customers that have more than $100,000 in assets. These deposits can be reinvested in loans to borrowers B1 though Bo, for a spread that makes these deposits profitable to the bank 10 unlike holding government securities to collateralize the deposits it sent to the money center bank. It should be noted that the second deposits back to the bank 10 are not necessarily from the same bank that received the first deposit from the bank 10, as will be described below in relation to an intermediary.

The deposits and transfers between the banks and larger money center banks can be tracked using a database, from which reports can be generated on a periodic basis, or whenever an exchange between the bank and the money center bank is completed. These reports may be, for example, transfer reports and deposit receipt reports, which provide information regarding the deposits and transfers, such as the deposit and transfer amounts, time and date of the deposits and transfers, etc. The reports may, in one embodiment, be sent electronically, for example, on the Web.

Figure 3:
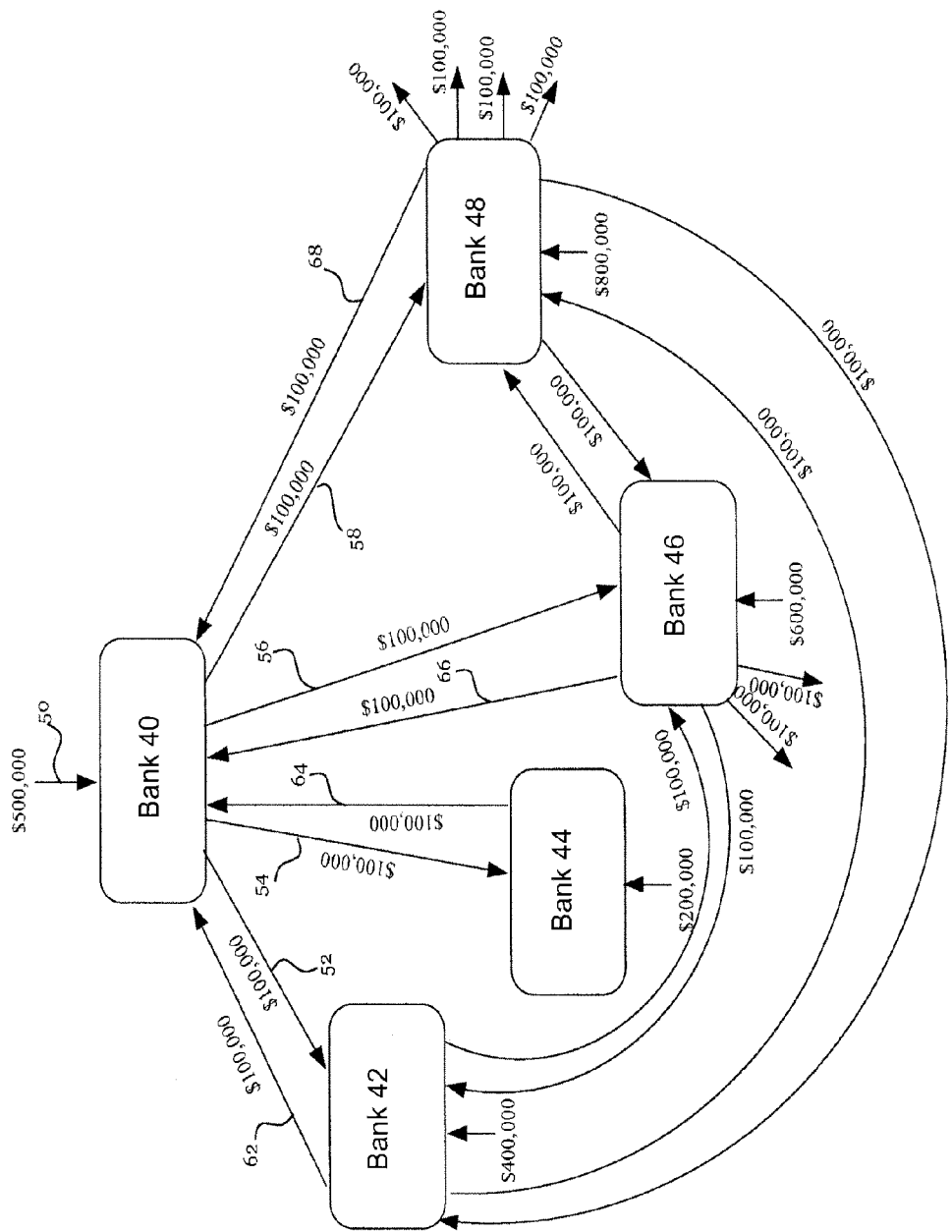
FIG. 3 is a block diagram of another exemplary embodiment of the present invention.

According to another exemplary embodiment of the present invention, banks may exchange on a one-for-one basis or on such other agreed upon terms the municipal funds they receive from a particular municipal entity, or the excess municipal funds they receive from a particular municipal entity over the maximum amount that is federally insured, e.g., $100,000, in increments that are equal to or less than the maximum amount that is federally insured. By conducting such an exchange, each of the banks can make higher margins on federally insured deposits, and does not need to invest in lower profit government securities. For example, as shown in FIG. 3, bank 40 receives $500,000 in public deposits represented by line 50 from, for example, a municipal entity. Assuming that the maximum amount that is federally insured is $100,000, the bank 40 then sends a first deposit of $100,000 or some lesser or greater amount to each of banks 42, 44, 46 and 48, electronically, by messenger, or by any other convenient method, as represented by lines 52, 54, 56, and 58, and retains the remaining $100,000 or some lesser or greater amount. It is intended that the receiving bank deposit this first deposit in a federally insured account. First electronic signals are also sent to each of the one or more banking institutions relating to information on the one or more first deposits to the one or more banking institution. Since the remaining funds are federally insured, the bank 40 can use these funds to obtain a higher profit spread by investing in, for example, individual and commercial loans. Further, since banks 42, 44, 46 and 48 receive deposits from bank 40 in amounts that can be deposited in federally insured accounts, each of the banks 42, 44, 46 and 48 can then reinvest those deposits in loans or other financial products that obtain a higher profit spread.

In return for receiving the $100,000 from bank 40, one or more of these bank 42, 44, 46 and 48 deposits electronically, by messenger, or by any other convenient method, an equal or lesser or greater (for example, a percentage) amount of funds in the bank 40. These deposits are represented by the lines 62, 64, 66, and 68. Second electronic signals relating to information on the second deposits from the one or more banking institutions 42, 44, 46, and 48 may be sent. These second electronic signals are also represented by the lines 62, 64, 66, and 68. These funds may also be municipal deposits, corporate deposits or other types of deposits which can be loaned out on competitive terms and conditions. Thus, for example each bank 42, 44, 46 and 48 can use the bank 40 as one of the banks to which it sends municipal funds to be deposited in federally insured accounts in increments equal to or less than the maximum amount that is federally insured. For example, bank 42 may receive a public deposit of $400,000, in which case bank 42 may deposit $100,000 in banks 40, 44 and 46. Similarly, bank 46, which receives a public deposit of $600,000, may deposit $100,000 in each of banks 40, 42, 48 and two other bank from which bank 44 has received funds to be deposited in federally insured accounts. Similarly, bank 48, which receives a public deposit of $800,000, may deposit $100,000 in each of banks 40, 42, 46 and four other banks from which bank 48 has received funds to be deposited in federally insured accounts. Note that in this example, bank 44 only receives a deposit from bank 40, and not from banks 42, 46 and 48, since bank 44 only deposited funds in bank 40. However, note that the invention is not limited to complete fund reciprocity between banks, so that a bank receiving and transferring out public funds may receive second funds in return from banks other than the banks receiving the public funds from the bank. In one embodiment, regardless of which banks provide the second deposits, the total of the second deposits going back to the bank sending out the first deposits may be set to equal the total of the first deposits or some lesser or greater negotiated amount, for example, a percentage of the first deposits.

Figure 4:
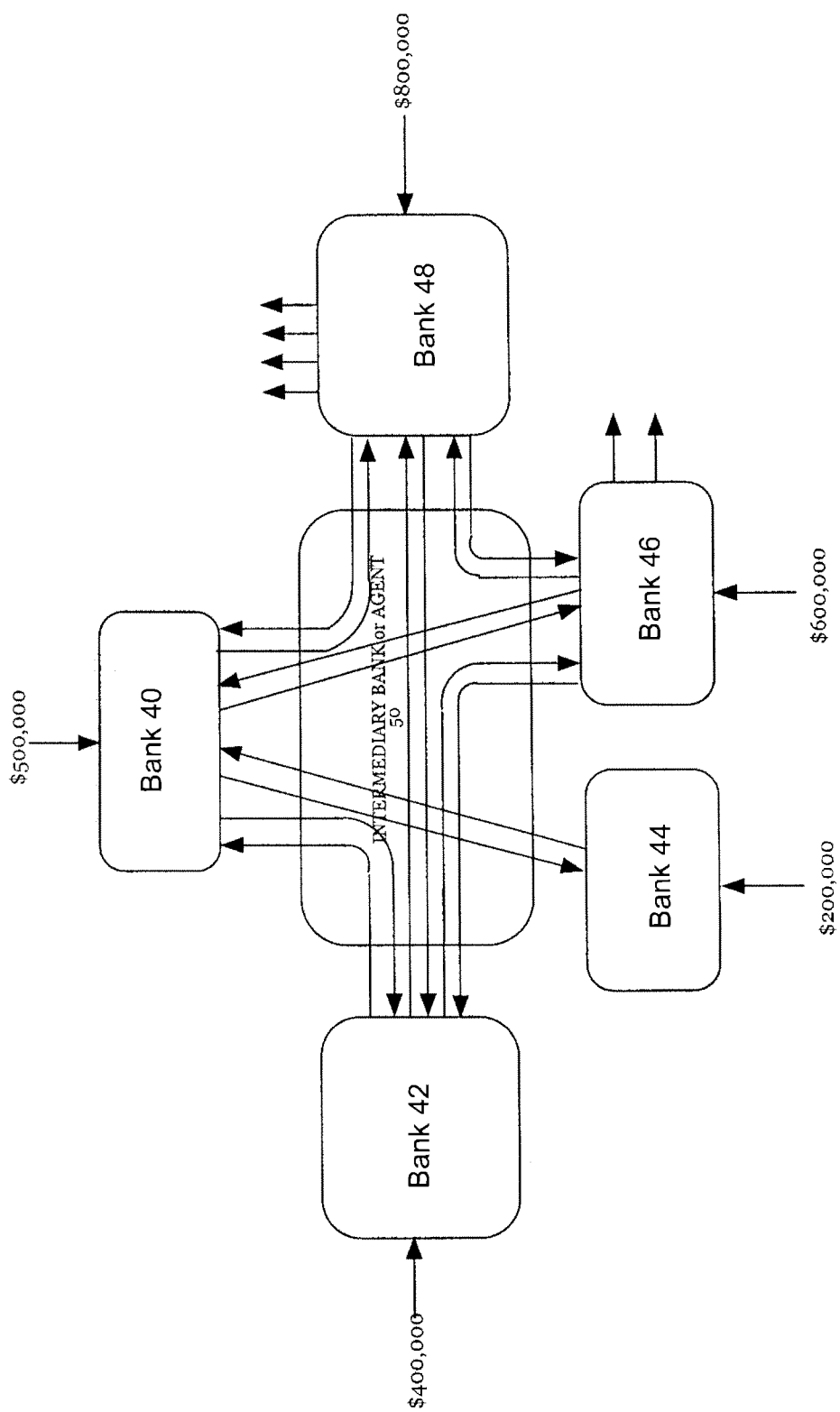
FIG. 4 is a block diagram of another exemplary embodiment of the present invention.

As shown in FIG. 4, the exchange between the banks 40-48 may take place with an intermediary, such as an intermediary bank or intermediary agent 50 (each arrow in FIG. 4 represents a deposit of $100,000). The intermediary may maintain, or have maintained, an electronic database containing (1) information on each deposit, including the source and amount of the deposit, and (2) on each transfer, and the source of the funds, the recipient of the transfer and the amount. In one embodiment, the federally insured interest bearing accounts at the various banks are money market deposit accounts (MMDA), and the intermediary operates as an agent for the customers of the banks. The MMDA accounts are registered in compliance with FDIC regulations to allow pass through of FDIC insurance. The intermediary administers the operation by determining/selecting which banks are to receive funds and which banks are to send reciprocal deposits or second funds to the bank. A variety of different criteria may be used by the intermediary to select banks for the receipt or transfer of funds, such as the amount of municipal funds held thereby, the amount of funds that the bank can transfer without restriction, and an agreed minimum or maximum level of funds at a given bank. The intermediary, in one embodiment, would then ensure that the total of the second deposits from the selected banks going back to the bank sending out the first deposits may be set to equal the total of the first deposits or some lesser or greater negotiated amount, for example, a percentage of the first deposits. Note that the intermediary could use a variety of different methods for transferring funds including electronic transfer, or messenger transfer where a transfer limit is imposed by banking regulation. The two exemplary embodiments of the present invention described herein may be used alone or in conjunction with one another to allow banks to obtain an adequate profit spread on investments.

Figure 5:
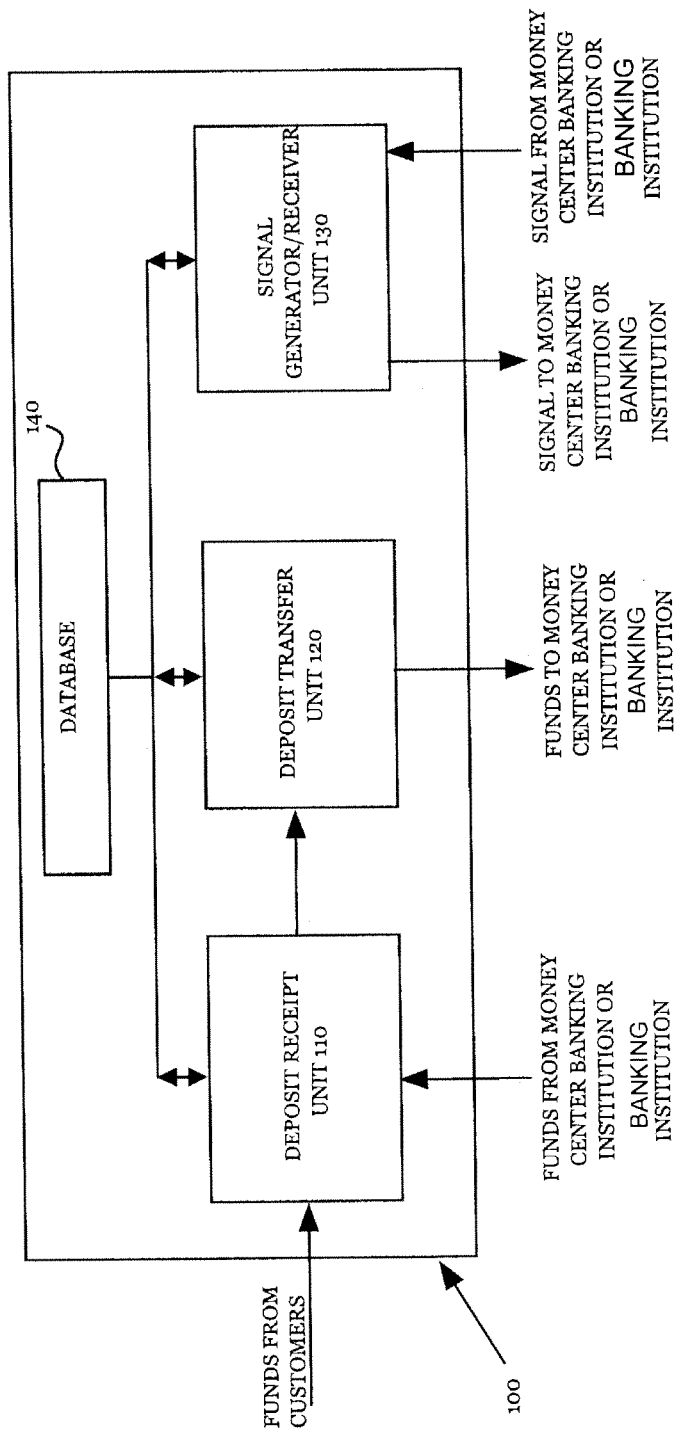
FIG. 5 is a block diagram showing a system according to an exemplary embodiment of the present invention.

FIG. 5 is a block diagram showing a system for exchanging funds for effective investment of public deposits according to an exemplary embodiment of the present invention. The system, generally designated by reference number 100, includes a deposit receipt unit 110, a deposit transfer unit 120 and a signal generator/receiver unit 130. The deposit receipt unit 110 receives electronically, or by messenger, or by another convenient method, one or more first deposits from each of one or more customers, where the customers are public entities and the one or more first deposits are required to be federally insured or collateralized by government securities. The deposit receipt unit 110 also receives deposits from banking institutions or money center banking institutions, depending on which of the above-described investment methods are being implemented. In the case of receipt of funds of individuals or corporations from money center banking institutions, e.g., second deposits, the unit 110 records the deposit of the funds into accounts having at least a first rate of return and then invests or facilitates the investment of received second deposits in investments that have at least a second rate of return. The deposit transfer unit 120 transfers electronically, or by messenger, or by another convenient method, the first deposits to a money center banking institution or portions of the first deposits to banking institutions, once again depending on which of the above-described investment methods are being implemented. Further, depending on the investment method, the signal generator/receiver unit either sends signals to or receives signals from money center banking institutions or sends signals to or receives signals from banking institutions, where the signals relate to deposit information.

Accordingly, in one embodiment, a system is provided, either within a bank or in an intermediary, for exchanging funds to allow for effective investment of public deposits, comprising: a first deposit receipt unit 110 for receiving one or more first deposits from each of one or more customers, where the one or more customers are public entities and the one or more first deposits are required to be federally insured or collateralized by government securities. The system in this embodiment further comprises a deposit transfer unit 120 for transferring at least a portion of the one or more first deposits to a money center banking institution. The system further comprises a signal generator 130 for generating and sending first electronic signals relating to information on the at least a portion of the one or more first deposits to the money center banking institution. The system also includes a second deposit receipt unit 110 for receiving one or more second deposits from the money center banking institution, where the one or more second deposits are at least in part covered by federal deposit insurance; and a signal receiver 130 for receiving second electronic signals relating to information on the one or more second deposits from the money center banking institution.

In a yet further embodiment, a system is provided for exchanging funds to allow for effective investment of public deposits, comprising a first deposit receipt unit 110 for receiving one or more first deposits from each of one or more customers, where the one or more customers are public entities and the one or more first deposits are required to be federally insured or collateralized by government securities. The system in this embodiment further comprises a deposit transfer unit 120 for transferring one or more portions of the one or more first deposits to a corresponding one of one or more banking institutions. The system also includes a signal generator 130 for generating and sending first electronic signals to each of the one or more banking institutions relating to information on the one or more portions of the one or more first deposits to the one or more banking institutions. The system also comprises a second deposit receipt unit 110 for receiving at least one second deposit from at least one of the one or more banking institutions, the second deposit received from the at least one of the one more banking institutions being equal or lesser or greater in amount to the one or more portions transferred into each of the one or more banking institutions; and a signal receiver for receiving second electronic signals relating to information on the second deposit from the one or more banking institutions.

Note that one or more processors may be used to implement the units 110, 120 and 130. Also, an electronic database 140 is maintained to record: (1) information about each of the received deposits in unit 110, including the source of the deposits, amounts, account data and any investment data, and (2) information about the transfers by unit 110, including amounts and account data.

It should be noted that in a preferred embodiment of the invention, the sending bank that transfers the first deposits and the receiving banks that transfer the second deposits could all be local banks. It should also be noted that in one embodiment, all of the second deposits are federally insured.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method, comprising:
   (A) accessing, using one or more computers, one or more electronic databases, stored on one or more computers-readable media, the one or more databases comprising:
      (1) aggregated account information for a plurality of Federal Deposit Insurance Corporation (FDIC)-insured and interest-bearing aggregated deposit accounts held in a plurality of financial institutions participating in a program, wherein funds from client accounts of a plurality of clients are aggregated with funds of other client accounts in the aggregated deposit accounts held in the financial institutions, with the aggregated deposit accounts providing non-penalized liquidity for the funds held therein, the aggregated account information for the respective aggregated deposit accounts comprising a balance of funds held in the respective aggregated deposit account;
      (2) client account information for funds, for each of a plurality of respective client accounts, held in one or more of the plurality of the financial institutions, comprising a respective balance of funds of the respective client account held in each of one or more of the aggregated deposit accounts holding funds of the respective client account;
   (B) receiving or obtaining into the one or more computers via the Internet, transfer data comprising an amount of governmental funds for one or more of the client accounts of a first one of the financial institutions;
   (C) allocating at least a portion of the amount of governmental funds for the one or more of the client accounts of the first financial institution, using the one or more computers, to a first set of one or more of the financial institutions other than the first financial institution, comprising selecting one or more of the financial institutions for the first set based at least in part on accessing the data held in the one or more databases to determine that funds that are FDIC-insured have been received for the program on behalf of one or more of the client accounts of the respective financial institution;
   (D) selecting one or more of the financial institutions for a second set of financial institutions based at least in part on a maximum and/or a minimum level of funds in the program to be held at the respective financial institution;
   (E) allocating, using the one or more computers, to the first financial institution for the one or more aggregated deposit accounts held therein, an amount of funds that is FDIC-insured from the second set of one or more of the financial institutions other than the first financial institution, so that an amount of funds sourced from the second set of the financial institutions and held in the first financial institution is approximately equal to or greater than the amount of the governmental funds sourced from the first financial institution;
   (F) generating and communicating data comprising one or more amounts for one or more instructions, using the one or more computers and a network communication link, to transfer funds between or among two or more of the financial institutions based at least in part on the allocations to and/or from the respective one of more of the financial institutions set forth in the allocating steps; and
   (G) using the one or more computers to update the one or more databases, comprising updating for respective of the aggregated deposit accounts a balance of respective funds held in the respective aggregated deposit account, and updating the client account information for funds, for each of multiple of the respective client accounts, held in one or more of the plurality of the financial institutions, comprising a respective balance of funds of the respective client account held in each of one or more of the aggregated deposit accounts holding funds of the respective client account based on at least the allocating steps.

2. The method as defined in claim 1, wherein a total of the funds allocated to the first financial institution comprises a predetermined percentage of the amount sourced from the first financial institution.

3. The method as defined in claim 1, further comprising allocating, using the one or more computers, respective amounts from respective client accounts held in the second set of the financial institutions to the first financial institution to match the amount allocated to the first financial institution in the allocating step (E),
   wherein respective amounts from the respective client accounts allocated to the first financial institution are less than or equal to a maximum amount eligible for federal deposit insurance.

4. The method as defined in claim 1, further comprising allocating, using the one or more computers, respective amounts from respective client accounts held in the second set of the financial institutions to the first financial institution to match the amount allocated to the first financial institution in the allocating step (E),
   wherein only client accounts with respective balances less than or equal to a predefined threshold amount are allocated.

5. The method as defined in claim 1, further comprising allocating, using the one or more computers, respective amounts from respective client accounts held in the second set of the financial institutions to the first financial institution to substantially match the amount allocated to the first financial institution in the allocating step (E),
   wherein client accounts with respective balances greater than a predefined threshold amount are allocated.

6. The method as defined in claim 1, wherein the governmental funds are from one or more accounts of one or more public entities.

7. The method as defined in claim 1, wherein one or more of the financial institutions is a credit union.

8. The method as defined in claim 1, wherein one or of the financial institutions is a bank.

9. The method of claim 1, wherein the steps of the claim are performed by an intermediary.

10. The method as defined in claim 1, wherein the selecting the one or more for the second set of one or more financial institutions is also based at least in part on an amount of funds the respective financial institution can transfer without restriction.

11. The method as defined in claim 1, wherein the selecting one or more for the second set of financial institutions is also based at least in part on maintaining for at least one of the financial institutions a partial or complete reciprocity between sourced funds from the respective one financial institution and funds allocated to the respective one financial institution.

12. The method as defined in claim 1, wherein the allocating to the first financial institution step comprises allocating one or more amounts from the second set of financial institutions to the first financial institution so that a total of amounts allocated to the first financial institution from the second set of the financial institutions is greater than the total of amounts of the governmental funds sourced from the first financial institution.

13. The method as defined in claim 1, wherein the allocating to the first financial institution step comprises allocating one or more amounts from the second set of financial institutions to the first financial institution so that a total of amounts allocated to the first financial institution from the second set of the financial institutions is equal to the one or more amounts of the governmental funds sourced from the first financial institution.

14. The method as defined in claim 1, wherein the one or more instructions to transfer funds between or among one or more of the financial institutions in the generating and communicating data step permit an unlimited number of withdrawals in a month from a limited number of the financial institutions.

15. The method as defined in claim 1, further comprising:
   obtaining, from a communication link and the one or more computers, for each of multiple client accounts, data for deposits/transfers to and/or withdrawals/transfers from respective client accounts, said data comprising transaction data for one or more deposits/transfers for the respective client account and/or data for one or more withdrawals/transfers from the respective client account, and/or a net thereof;
   allocating, using the one or more computers, the clients' deposits/transfers and/or withdrawals/transfers and/or nets thereof to one or more of the aggregated deposit accounts;
   obtaining a respective net amount, using the one or more computers, for each of multiple of the respective aggregated deposit accounts, the respective net amount comprising the client deposits/transfers to and/or withdrawals/transfers from the client accounts allocated to the respective aggregated deposit account, on a regular basis.

16. The method as defined in claim 1, wherein the generating and communicating data for one or more instructions step to transfer funds causes at least one aggregated deposit account to have more than six withdrawals/transfers in a month.

17. The method as defined in claim 1, wherein the financial institutions in the first set of one or more financial institutions are the same as the financial institutions in the second set of the financial institutions.

18. The method as defined in claim 1, wherein one or more of the financial institutions in the first set of financial institutions are different from one or more of the second set of the financial institutions.

19. The method as defined in claim 1, wherein the allocating step (C) comprises allocating at least a portion of the amount of governmental funds to one or more of the financial institutions that hold respective inventories of government securities and using this inventory of government securities to collateralize at least a portion of the governmental funds.

20. A system, comprising:
   one or more computers comprising memory wherein the memory stores computer-readable instructions comprising program code that, when executed, cause the one or more computers to perform the steps:
   (A) accessing, using the one or more computers, one or more electronic databases, stored on one or more computers-readable media, the one or more databases comprising:
      (1) aggregated account information for a plurality of Federal Deposit Insurance Corporation (FDIC)-insured and interest-bearing aggregated deposit accounts held in a plurality of financial institutions participating in a program, wherein funds from client accounts of a plurality of clients are aggregated with funds of other client accounts in the aggregated deposit accounts held in the financial institutions, with the aggregated deposit accounts providing non-penalized liquidity for the funds held therein, the aggregated account information for the respective aggregated deposit accounts comprising a balance of funds held in the respective aggregated deposit account;

(2) client account information for funds, for each of a plurality of respective client accounts, held in one or more of the plurality of the financial institutions, comprising a respective balance of funds of the respective client account held in each of one or more of the aggregated deposit accounts holding funds of the respective client account;

(B) receiving or obtaining into the one or more computers via the Internet, transfer data comprising an amount of governmental funds for one or more of the client accounts of a first one of the financial institutions;

(C) allocating at least a portion of the amount of governmental funds for the one or more of the client accounts of the first financial institution, using the one or more computers, to a first set of one or more of the financial institutions other than the first financial institution, comprising selecting one or more of the financial institutions for the first set based at least in part on accessing the data held in the one or more databases to determine that funds that are FDIC-insured have been received for the program on behalf of one or more of the client accounts of the respective financial institution;

(D) selecting one or more of the financial institutions for a second set of financial institutions based at least in part on a maximum and/or a minimum level of funds in the program to be held at the respective financial institution;

(E) allocating, using the one or more computers, to the first financial institution for the one or more aggregated deposit accounts held therein, an amount of funds that is FDIC-insured from the second set of one or more of the financial institutions other than the first financial institution, so that an amount of funds sourced from the second set of the financial institutions and held in the first financial institution is approximately equal to or greater than the amount of the governmental funds sourced from the first financial institution;

(F) generating and communicating data comprising one or more amounts for one or more instructions, using the one or more computers and a network communication link, to transfer funds between or among two or more of the financial institutions based at least in part on the allocations to and/or from the respective one of more of the financial institutions set forth in the allocating steps; and (G) using the one or more computers to update the one or more databases, comprising updating for respective of the aggregated deposit accounts a balance of respective funds held in the respective aggregated deposit account, and updating the client account information for funds, for each of multiple of the respective client accounts, held in one or more of the plurality of the financial institutions, comprising a respective balance of funds of the respective client account held in each of one or more of the aggregated deposit accounts holding funds of the respective client account based on at least the allocating steps.

21. The system as defined in claim 20, wherein the allocating step (C) comprises allocating at least a portion of the amount of governmental funds to one or more of the financial institutions that hold respective inventories of government securities and using this inventory of government securities to collateralize at least a portion of the governmental funds.

22. The system as defined in claim 20, further comprising computer-readable program code that, when executed, cause the one or more computers to perform the step of allocating respective amounts from respective client accounts held in the second set of the financial institutions to the first financial institution to match the amount allocated to the first financial institution in the allocating step (E), wherein respective amounts from the respective client accounts allocated to the first financial institution are less than or equal to a maximum amount eligible for federal deposit insurance.

* * * * *